(12) United States Patent
Klosowski et al.

(10) Patent No.: US 7,144,937 B2
(45) Date of Patent: *Dec. 5, 2006

(54) ADHESION PROMOTERS FOR SEALANTS

(75) Inventors: Jerome M. Klosowski, Bay City, MI (US); Gary Wentworth, Chicago, IL (US); Zhi Chen, Memphis, TN (US); Stephen Semlow, Palos Park, IL (US); Stephen O'Rourke, Bolingbrook, IL (US); Kimberly L. Stefanisin, Oak Lawn, IL (US); John English, Oak Lawn, IL (US)

(73) Assignee: CPH Innovations Corp., Chicago, IL (US)

( * ) Notice: Subject to any disclaimer, the term of this patent is extended or adjusted under 35 U.S.C. 154(b) by 402 days.

This patent is subject to a terminal disclaimer.

(21) Appl. No.: 10/718,233

(22) Filed: Nov. 19, 2003

(65) Prior Publication Data

US 2004/0122145 A1   Jun. 24, 2004

Related U.S. Application Data

(63) Continuation-in-part of application No. 10/434,616, filed on May 9, 2003, now Pat. No. 6,858,664, and a continuation-in-part of application No. 10/435,212, filed on May 9, 2003, now Pat. No. 6,969,737, which is a continuation-in-part of application No. 10/301,770, filed on Nov. 21, 2002, now abandoned, which is a continuation-in-part of application No. 10/144,229, filed on May 10, 2002, now Pat. No. 6,884,832.

(51) Int. Cl.
*C08K 5/09* (2006.01)
*C08K 5/34* (2006.01)
*C08K 5/101* (2006.01)
*C08K 5/12* (2006.01)

(52) U.S. Cl. ............... 524/284; 524/100; 524/306; 524/311; 524/315; 156/60; 156/327; 156/332; 156/335

(58) Field of Classification Search ............ 524/100, 524/284, 306, 311, 315; 156/60
See application file for complete search history.

(56) References Cited

U.S. PATENT DOCUMENTS

| | | | |
|---|---|---|---|
| 2,940,949 A | 6/1960 | Mullin et al. ............ 260/31.4 |
| 3,256,362 A | 6/1966 | Craubner et al. ......... 260/862 |
| 3,435,012 A | 3/1969 | Nordlander .............. 260/88.3 |
| 3,654,007 A | 4/1972 | Winstanley et al. ...... 156/132 |
| 3,825,515 A | 7/1974 | Lucas et al. ........... 260/31.8 M |
| 3,888,813 A | 6/1975 | Moult et al. ............ 260/343 |
| 3,951,887 A | 4/1976 | Tanimura et al. ........... 260/3 |
| 3,968,198 A | 7/1976 | Honda et al. ............ 264/343 |
| 3,968,295 A | 7/1976 | Solomon ................. 428/250 |
| 3,991,025 A | 11/1976 | Kutch et al. .............. 260/24 |
| 3,993,847 A | 11/1976 | Kondo .................... 428/451 |
| 4,016,119 A | 4/1977 | Elmer ..................... 260/17.5 |
| 4,025,454 A | 5/1977 | Rouzier .................... 252/182 |
| 4,026,744 A | 5/1977 | Elmer ..................... 156/110 A |
| 4,038,220 A | 7/1977 | Thompson .................. 260/3 |
| 4,054,561 A | 10/1977 | Strauss et al. ........... 260/22 D |
| 4,061,835 A | 12/1977 | Poppe et al. ............. 428/522 |
| 4,078,114 A | 3/1978 | Aronoff et al. ........... 428/379 |
| 4,130,535 A | 12/1978 | Coran et al. ......... 260/33.6 AQ |
| 4,134,869 A | 1/1979 | Kalafus et al. ........... 260/29.3 |
| 4,263,184 A * | 4/1981 | Leo et al. ................ 524/35 |
| 4,317,755 A | 3/1982 | Gregory .................. 524/276 |
| 4,376,711 A | 3/1983 | Shaub .................... 252/32.7 |
| 4,435,477 A | 3/1984 | Davis .................... 428/462 |
| 4,448,813 A | 5/1984 | Solomon .................. 427/381 |
| 4,469,748 A | 9/1984 | Sharma ................... 428/378 |
| 4,472,463 A | 9/1984 | Solomon .................. 427/381 |
| 4,472,537 A | 9/1984 | Johnson et al. ........... 523/160 |
| 4,521,558 A | 6/1985 | Mowdood ................. 524/145 |
| 4,532,080 A | 7/1985 | Delseth et al. ............ 556/139 |
| 4,550,147 A | 10/1985 | Oohara ................... 525/332.6 |
| 4,574,142 A | 3/1986 | Charnock ................. 525/305 |
| 4,588,761 A | 5/1986 | Thoma et al. .............. 524/38 |
| 4,605,590 A | 8/1986 | Delseth et al. ............ 428/295 |
| 4,605,693 A | 8/1986 | Mowdood ................. 524/239 |
| 4,645,788 A | 2/1987 | Okumoto et al. ........... 524/308 |
| 4,681,961 A | 7/1987 | Zerpner et al. ............ 556/428 |
| 4,683,250 A | 7/1987 | Mikami ................... 522/33 |
| 4,699,792 A | 10/1987 | Nick et al. ............... 424/446 |
| 4,704,334 A | 11/1987 | Delseth et al. ............ 428/458 |

(Continued)

FOREIGN PATENT DOCUMENTS

CA    2408772    4/2003

(Continued)

OTHER PUBLICATIONS

Hawley's Condensed Chemical Dictionary. Twelfth Edition. Richard J. Lewis. 1993. p. 240, 1026. "sealant" and "ceramic."*

(Continued)

*Primary Examiner*—Vasu Jagannathan
*Assistant Examiner*—Sandra Poulos
(74) *Attorney, Agent, or Firm*—Marshall, Gerstein & Borun LLP

(57) ABSTRACT

A sealant composition comprising a sealant, an adhesive resin, and a long chain ester, particularly dimerate and trimerate esters, is capable of unexpected adhesion to substrates such as ceramic substrates (e.g., concrete), glass substrates, metal substrates such as metal flat stock materials, polymeric substrates including substrates comprising natural and/or synthetic rubbers and substrates comprising thermoplastic polymeric materials, particularly for use in sealing around bathroom fixtures, in storage areas, vents, plumbing lines, flooring, wheel wells, and the like.

92 Claims, 10 Drawing Sheets

U.S. PATENT DOCUMENTS

Figure 1:
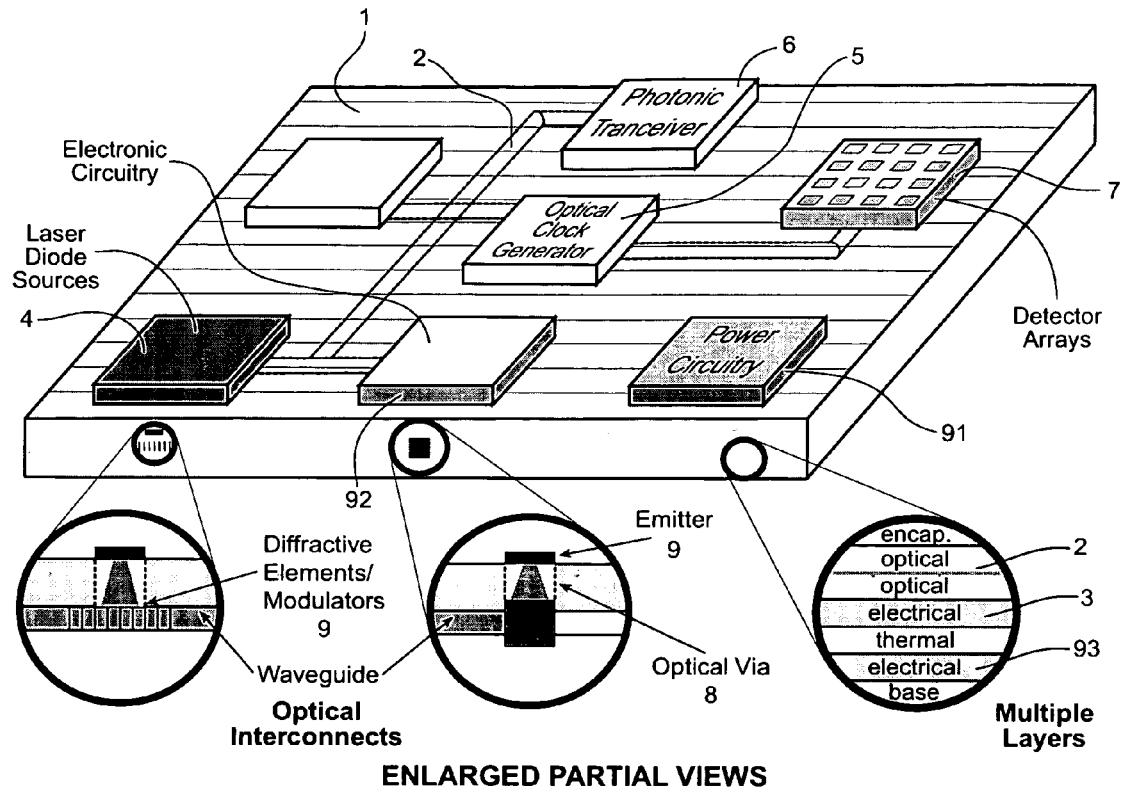
Figure 2:
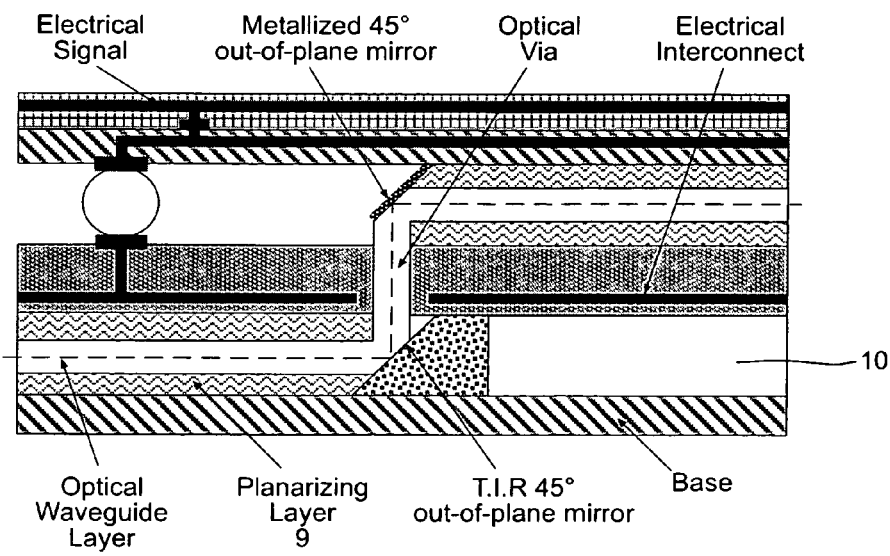
Figure 3:
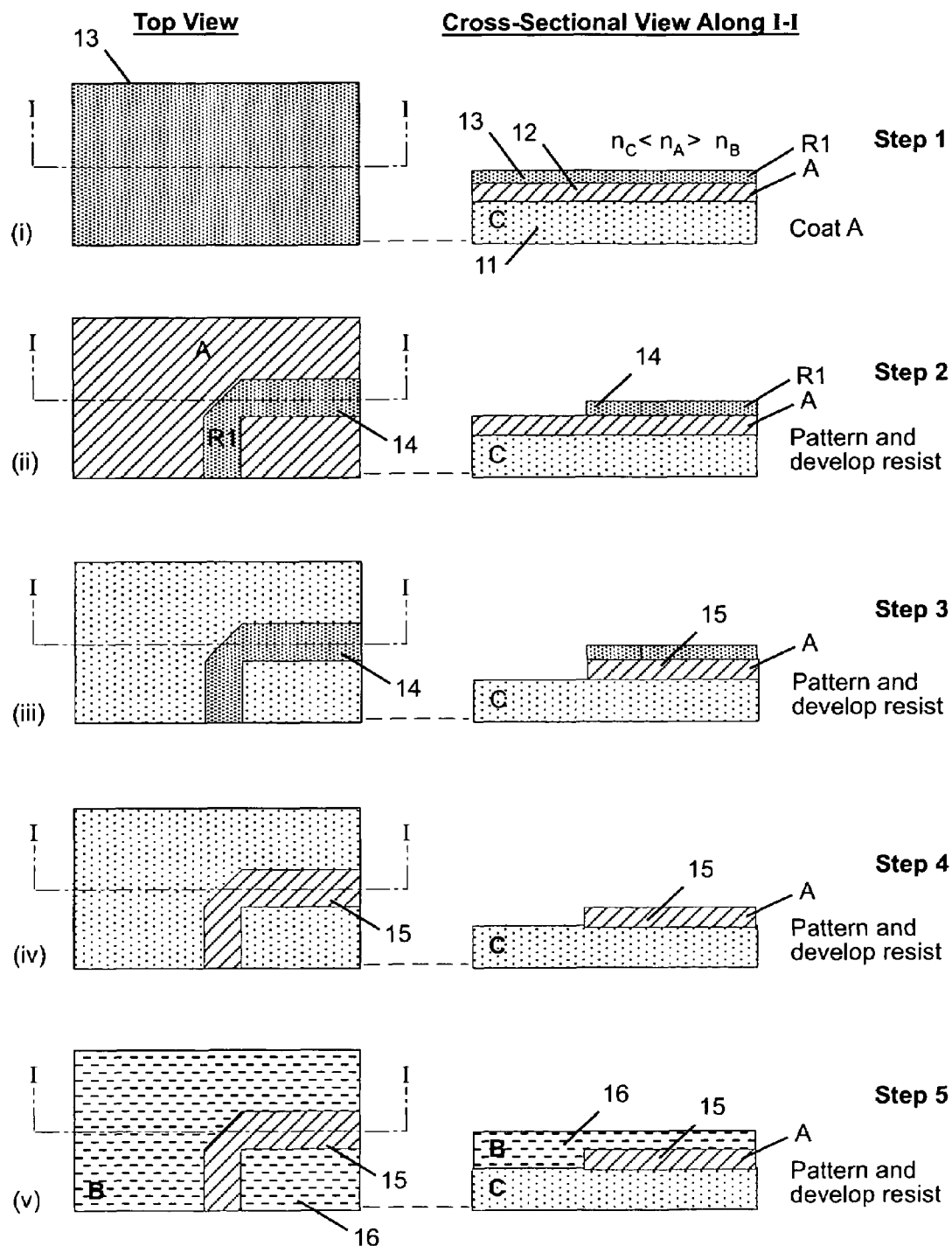

| | | | |
|---|---|---|---|
| 4,772,675 A | 9/1988 | Klosowski et al. | 528/15 |
| 4,776,909 A | 10/1988 | Bohm et al. | 156/117 |
| 4,785,033 A | 11/1988 | Mowdood | 524/86 |
| 4,789,381 A | 12/1988 | Oshiyama et al. | 8/115.6 |
| 4,797,446 A | 1/1989 | Dietlein et al. | 524/860 |
| 4,859,215 A | 8/1989 | Langsam et al. | 55/16 |
| 4,871,827 A | 10/1989 | Klosowski et al. | 528/17 |
| 4,888,404 A | 12/1989 | Klosowski et al. | 528/15 |
| 4,898,910 A | 2/1990 | Kamis et al. | 524/860 |
| 4,978,392 A | 12/1990 | Kilbarger et al. | 106/95 |
| 4,978,716 A | 12/1990 | Flynn et al. | 525/195 |
| 5,057,566 A | 10/1991 | Kobayashi et al. | 524/297 |
| 5,107,069 A | 4/1992 | Wichelhaus et al. | 524/314 |
| 5,169,716 A | 12/1992 | Croft et al. | 428/379 |
| 5,185,189 A | 2/1993 | Stenger et al. | 428/34.8 |
| 5,226,987 A | 7/1993 | Matsumoto et al. | 152/209 R |
| 5,246,051 A | 9/1993 | Inada et al. | 152/527 |
| 5,253,691 A | 10/1993 | Scriver | 152/537 |
| 5,290,886 A | 3/1994 | Ellul | 524/515 |
| 5,298,539 A | 3/1994 | Singh et al. | 524/92 |
| 5,357,025 A | 10/1994 | Altes et al. | 528/42 |
| 5,428,089 A | 6/1995 | Ishikawa et al. | 524/188 |
| 5,447,776 A | 9/1995 | Disselbeck | 428/178 |
| 5,455,075 A | 10/1995 | Longo | 427/398.1 |
| 5,492,728 A | 2/1996 | Carbary et al. | 427/314 |
| 5,565,541 A | 10/1996 | Carbary et al. | 528/17 |
| 5,571,352 A | 11/1996 | Disselbeck | 152/526 |
| 5,604,277 A | 2/1997 | Osborn | 524/270 |
| 5,605,955 A | 2/1997 | Hirai | 524/588 |
| 5,616,657 A | 4/1997 | Imamura et al. | 525/437 |
| 5,712,039 A * | 1/1998 | Marhevka et al. | 428/414 |
| 5,777,014 A * | 7/1998 | Hopper et al. | 524/308 |
| 5,792,805 A | 8/1998 | Williams | 524/100 |
| 5,834,582 A | 11/1998 | Sinclair et al. | 528/354 |
| 5,891,938 A | 4/1999 | Williams | 524/100 |
| 5,900,448 A | 5/1999 | Wideman et al. | 524/419 |
| 5,973,045 A | 10/1999 | Dowling et al. | 524/270 |
| 5,985,963 A | 11/1999 | D'Sidocky et al. | 524/105 |
| 6,127,512 A | 10/2000 | Asrar et al. | 528/272 |
| 6,138,731 A | 10/2000 | Miyazaki et al. | 152/532 |
| 6,211,262 B1 | 4/2001 | Mejiritski et al. | 522/71 |
| 6,255,367 B1 | 7/2001 | Bitler et al. | 523/522 |
| 6,262,180 B1 | 7/2001 | Klun et al. | 525/199 |
| 6,326,426 B1 | 12/2001 | Ellul | 524/270 |
| 6,423,767 B1 | 7/2002 | Weber et al. | 524/158 |
| 6,429,244 B1 | 8/2002 | Rinka et al. | 524/186 |
| 6,858,664 B1 * | 2/2005 | Wentworth et al. | 524/315 |
| 6,884,832 B1 * | 4/2005 | Wentworth et al. | 524/306 |
| 6,969,737 B1 * | 11/2005 | Wentworth et al. | 524/306 |
| 2002/0010275 A1 | 1/2002 | Maly et al. | 525/177 |
| 2003/0166743 A1 * | 9/2003 | Huynh-Tran et al. | 523/205 |
| 2003/0171471 A1 | 9/2003 | Pritschins et al. | 524/306 |
| 2004/0127615 A1 * | 7/2004 | Wentworth et al. | 524/284 |
| 2004/0127616 A1 * | 7/2004 | Wentworth et al. | 524/284 |
| 2005/0194752 A1 * | 9/2005 | Klosowski et al. | 277/650 |

FOREIGN PATENT DOCUMENTS

| | | |
|---|---|---|
| EP | 0 073 174 A1 | 3/1983 |
| EP | 0 450 105 A1 | 3/1990 |
| EP | 0 704 491 | 4/1996 |
| EP | 1 022 306 A1 | 7/2000 |
| FR | 2 417 522 | 9/1979 |
| GB | 1 045 577 | 10/1966 |
| GB | 2 022 089 | 12/1979 |
| JP | 06223316 | 4/1996 |
| WO | WO 03/095550 A1 | 11/2003 |

OTHER PUBLICATIONS

Hawley's Condensed Chemical Dictionary. Fourteenth Edition. Richard J. Lewis. Electronic version. 2002. "butyl rubber."*

Mechanics of Pneumatic Tires, Clark, National Bureau of Standards Monograph 112, U.S. Dept. of Commerce, pp. 241-243 and 290-291 (Nov. 1971).

Peterson et al., Resorcinol Bonding Systems for Steel Cord Adhesion, Rubber World, pp. 24-27 (Aug. 1984).

International Search Report for International (PCT) Patent Application No. PCT/US03/36990, dated Sep. 28, 2004.

* cited by examiner

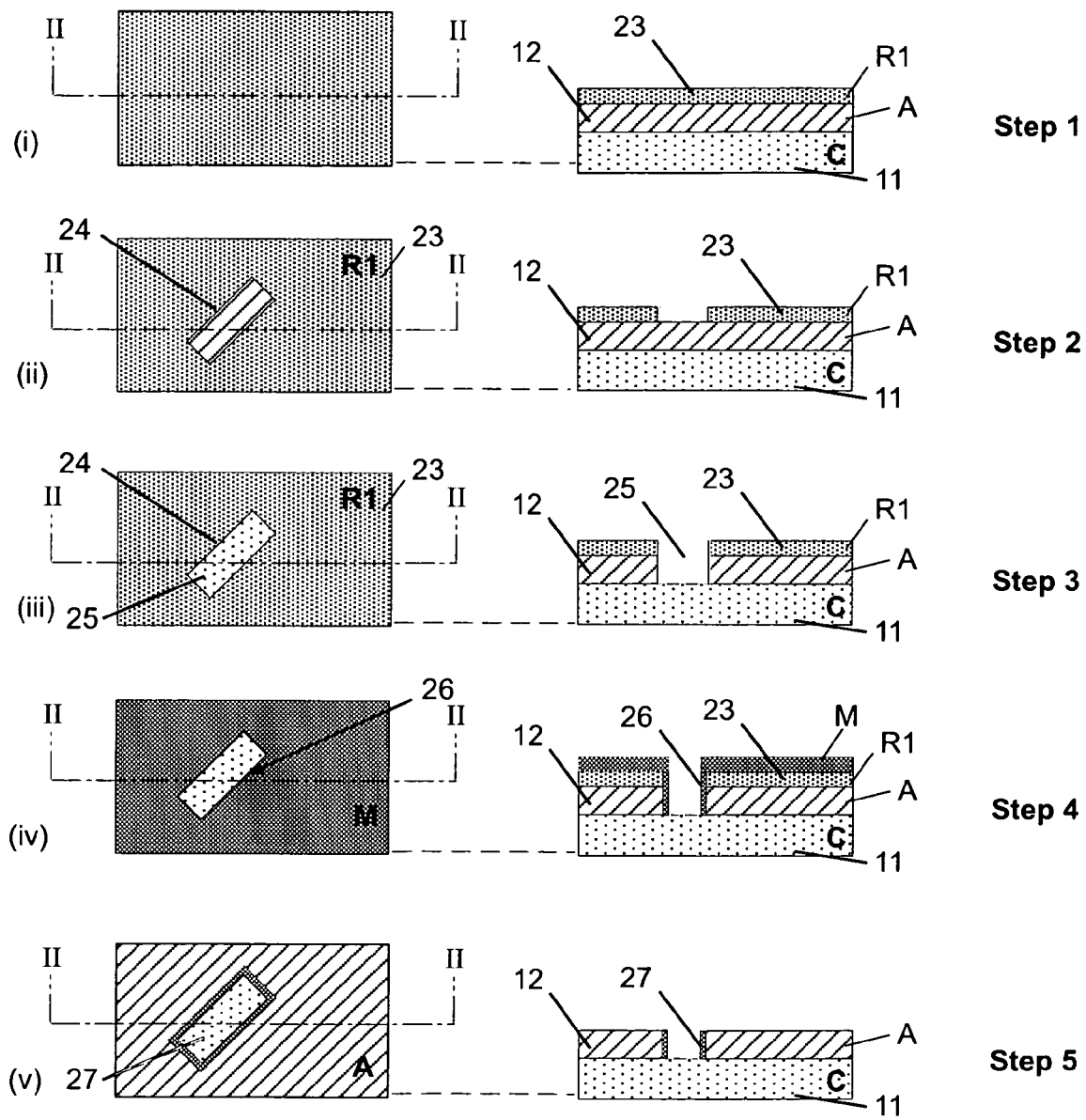
Figure 4 (i-v)

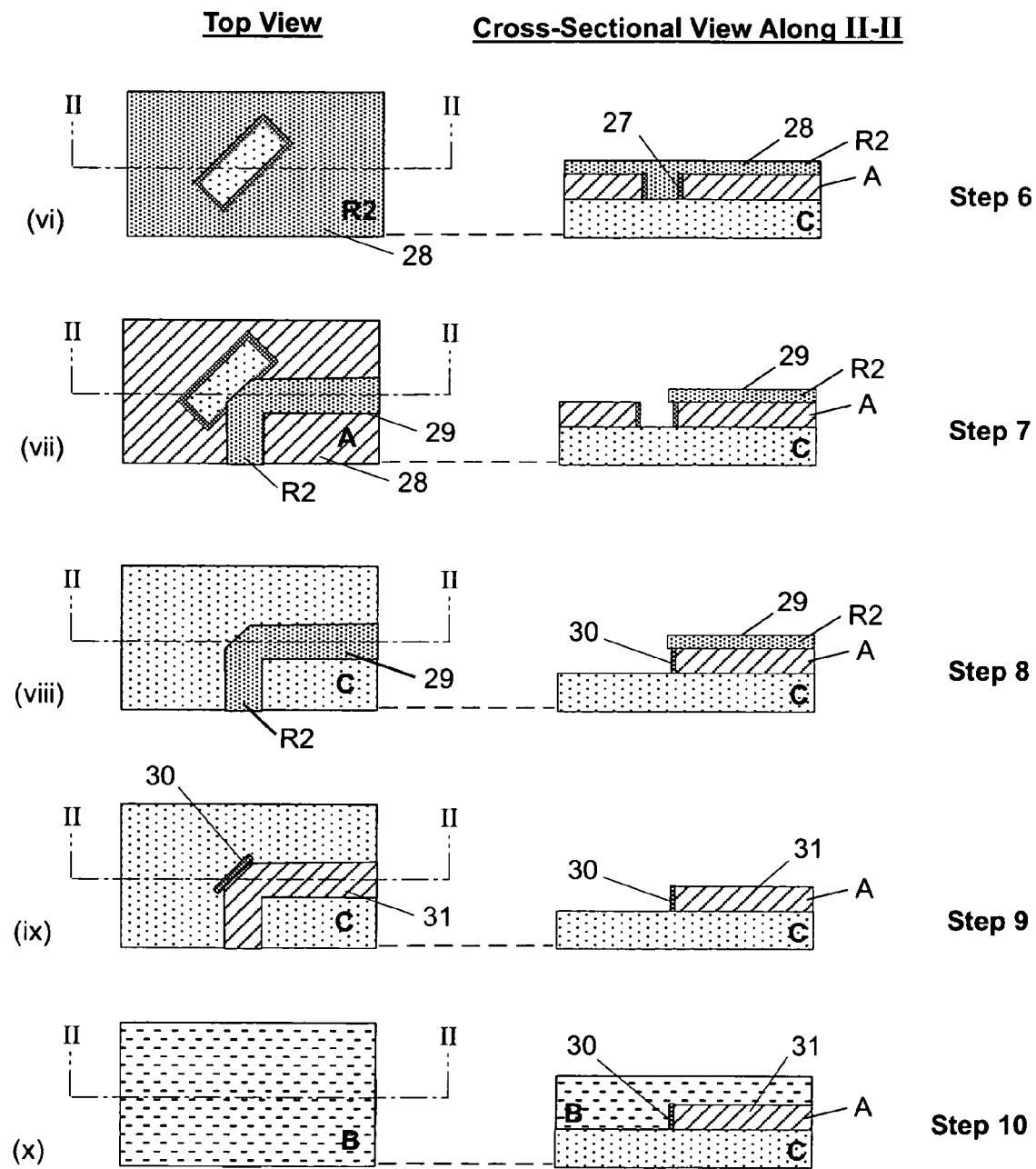
Figure 4 (vi-x)

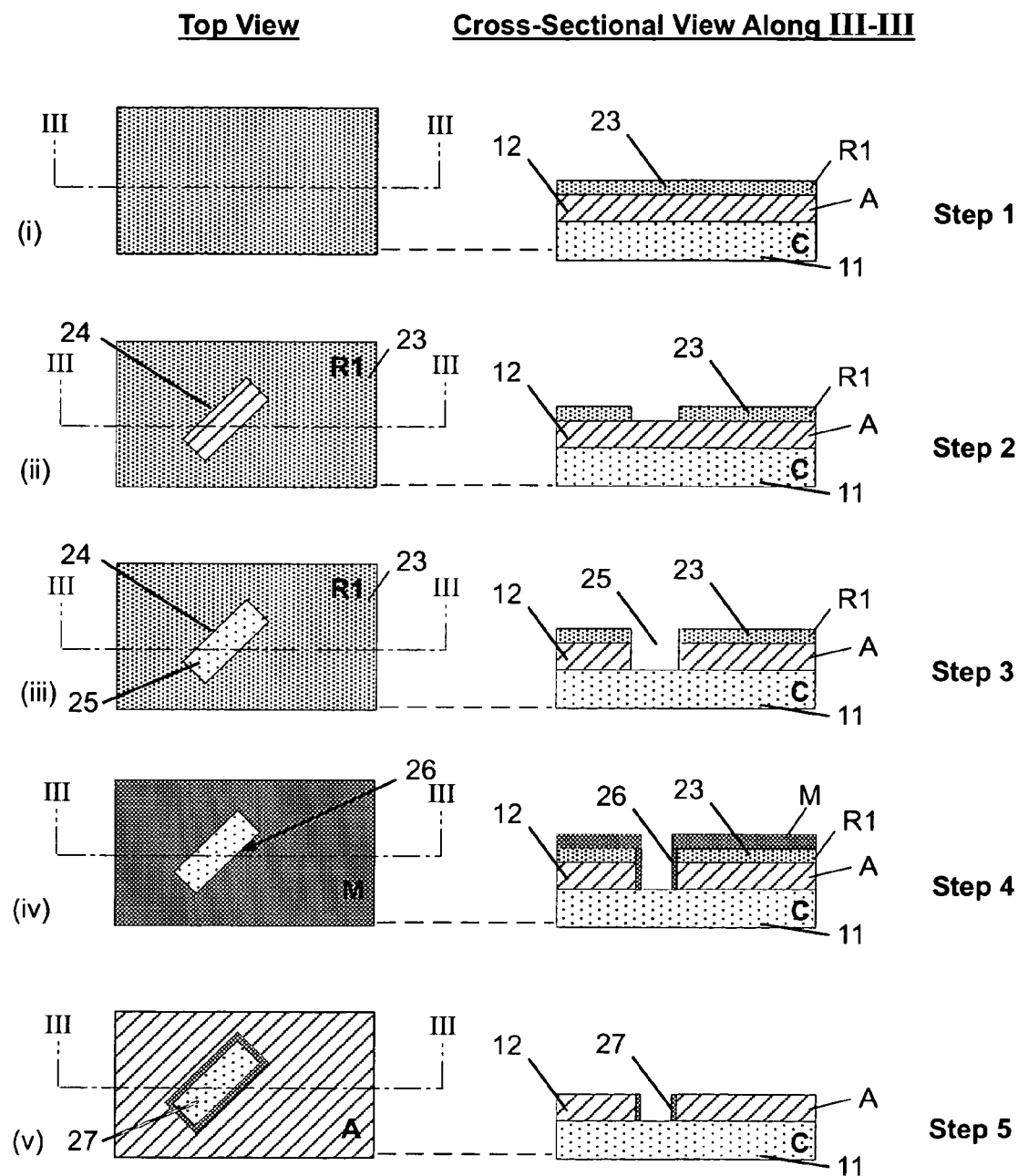
Figure 5 (i-v)

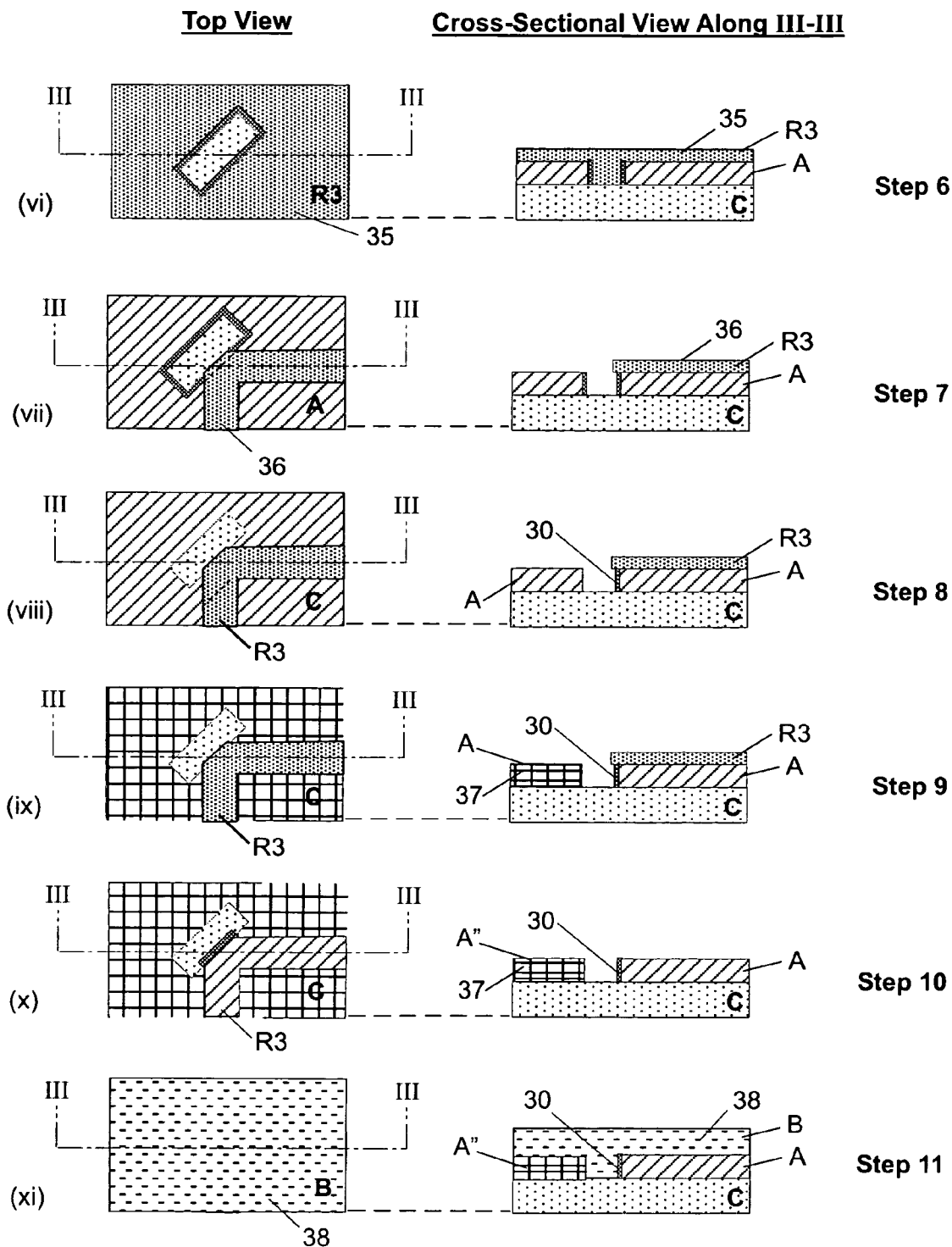
Figure 5 (vi-xi)

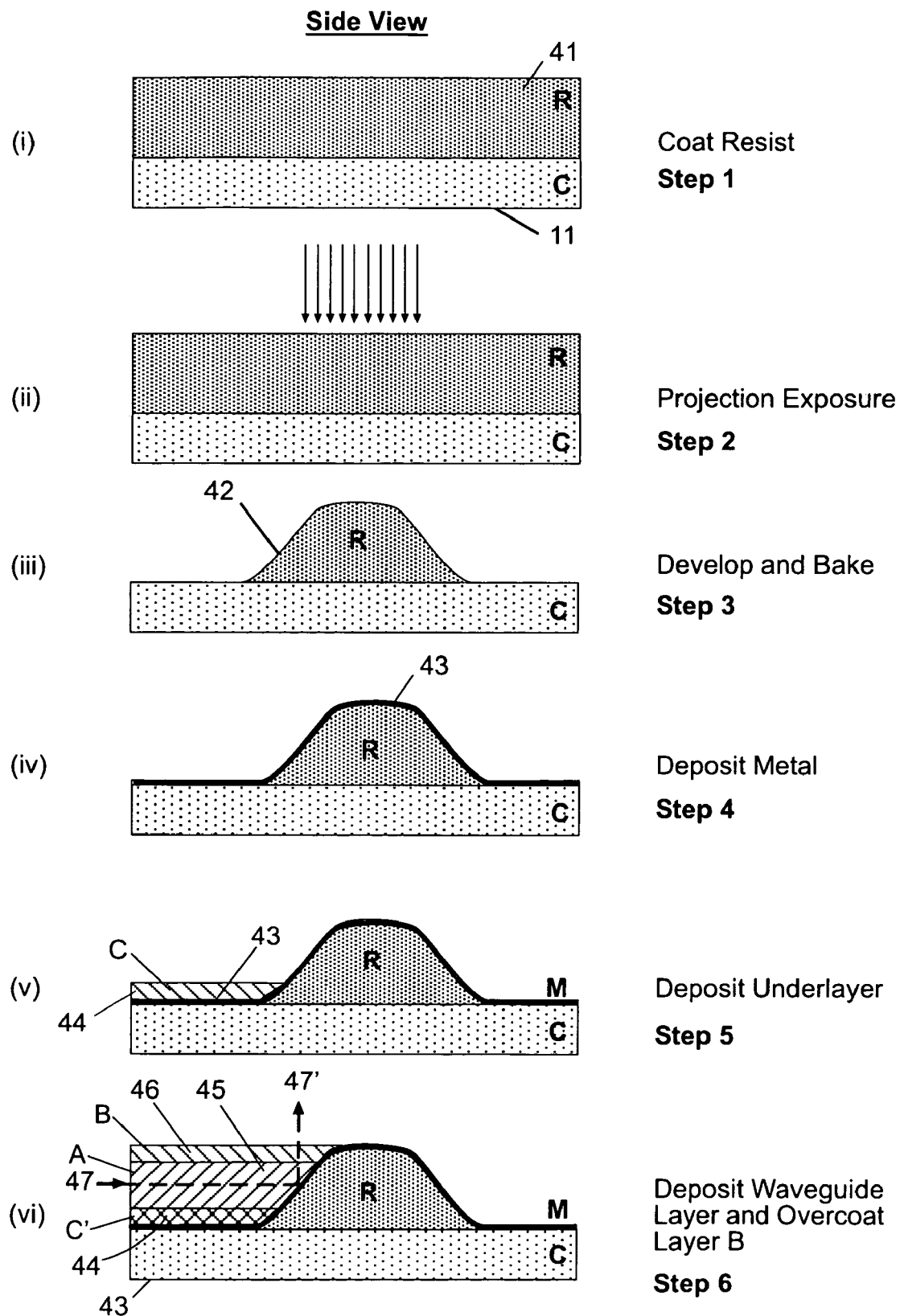
Figure 6 (i-vi)

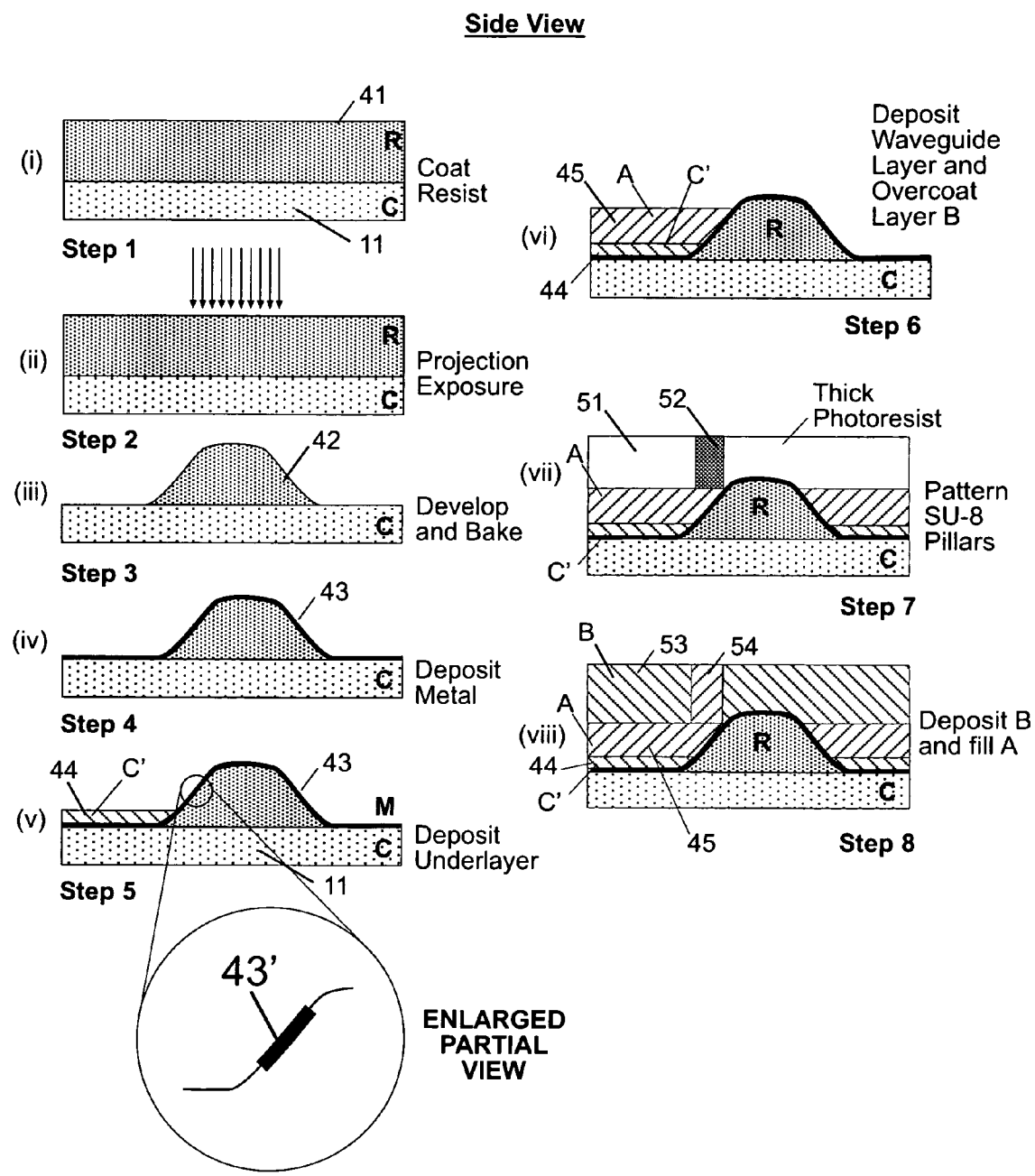
Figure 7 (i-viii)

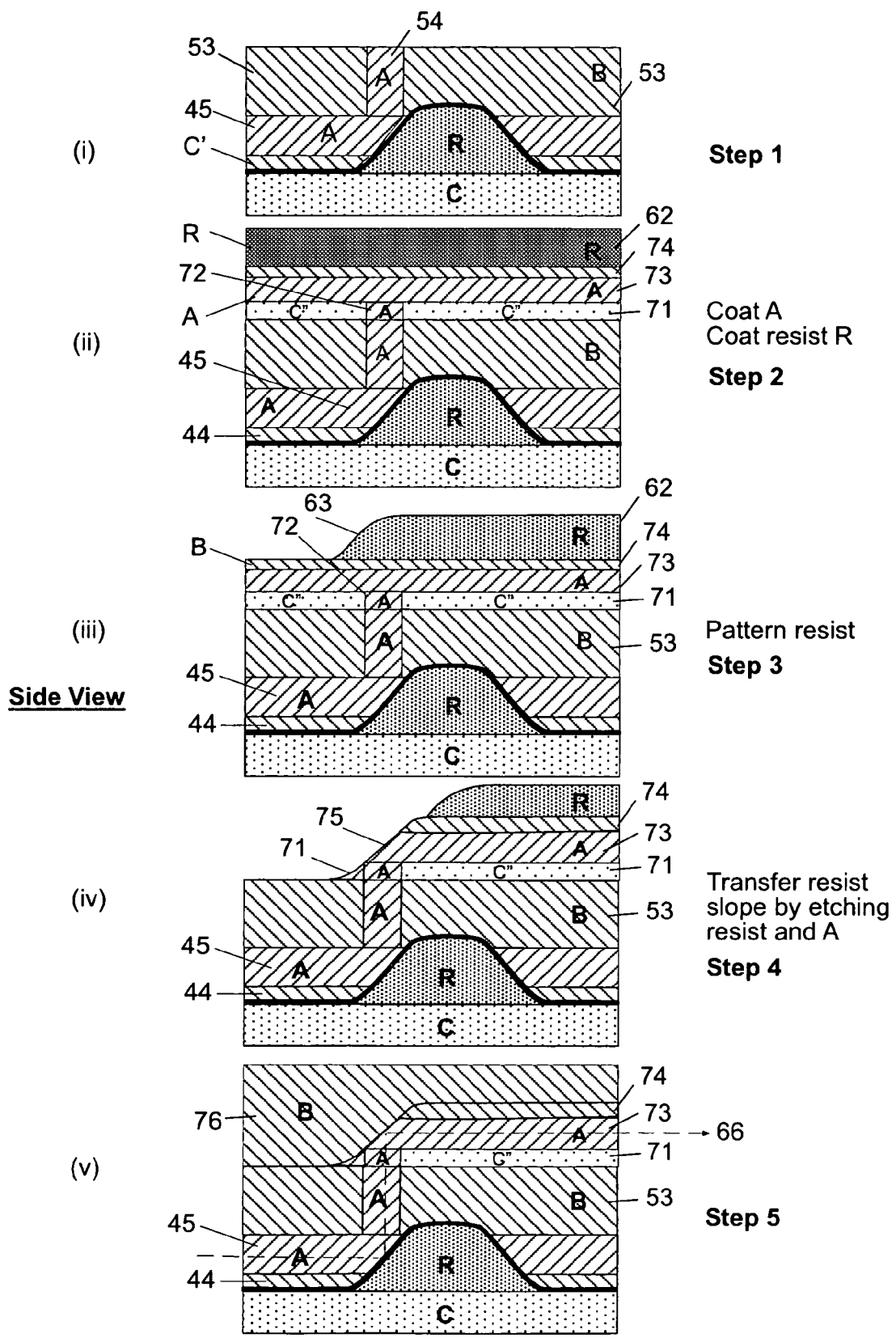
Figure 8 (i-v)

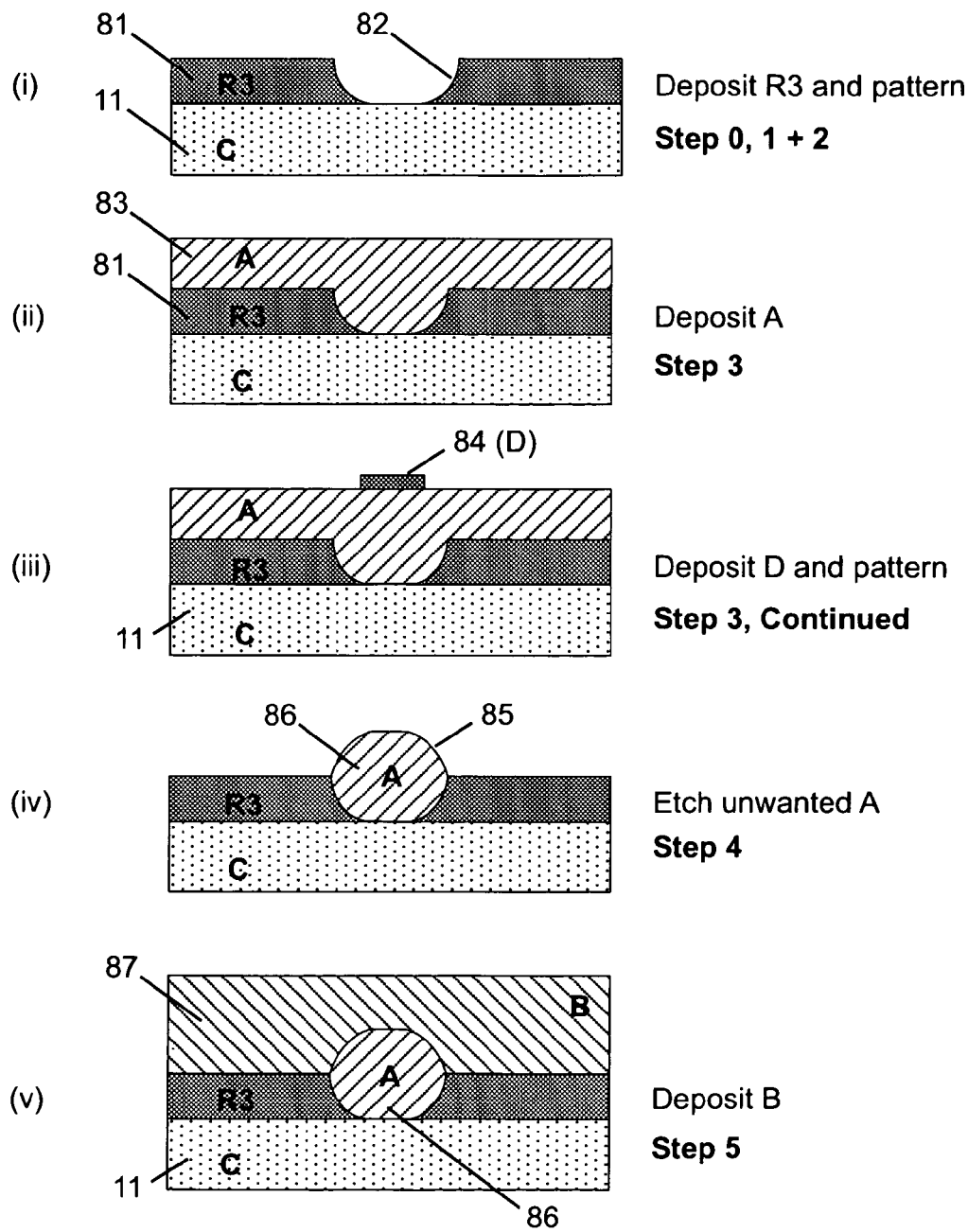
Figure 9 (i-v)

ADHESION PROMOTERS FOR SEALANTS

CROSS REFERENCE TO RELATED APPLICATIONS

This is a continuation-in-part of U.S. patent application Ser. No. 10/434,616, filed May 9, 2003, now U.S. Pat. No. 6,858,664 and U.S. patent application Ser. No. 10/435,212, filed May 9, 2003, now U.S. Pat. No. 6,969,737 which are both continuation-in-parts of U.S. patent application Ser. No. 10/301,770, filed Nov. 21, 2002, now abandoned and U.S. patent application Ser. No. 10/144,229, filed May 10, 2002, now U.S. Pat. No. 6,884,832 the entire respective disclosures of which are hereby incorporated by reference.

FIELD OF THE INVENTION

The present invention is directed to adhesion promoters for adhering sealants to substrates, such as glass, metals, ceramics, cementitious materials (e.g., concrete), asphaltic materials, and polymeric materials.

BACKGROUND OF THE INVENTION

Sealants typically have a gelatinous-type consistency which permits easy application to a substrate (or between substrates). Preferably, the sealant subsequently cures in-situ (i.e., where it has been applied) to form an elastomeric-type material. A wide variety of sealants have been developed, including silicone sealants, butyl rubber sealants, acrylic sealants, urethane sealants, and modified urethane sealants.

Such sealants generally include a polymer having a molecular weight low enough for ease of application and a curing agent which causes cross-linkages to form between the low molecular weight polymers (preferably, after application of the sealant to a substrate), thereby resulting in the formation of a cross-linked/branched polymeric material in-situ. Sealants are useful, for example, for filling openings in buildings to seal them from the elements.

In order to be successful in such applications, for example, in order to form a reliable seal, the sealant must adhere to the substrate to which it is applied. The formation of a reliable, effective seal is especially problematic when the sealant is continuously challenged by the elements, for example, when the sealant composition is submerged under water. Accordingly, compositions and methods for improving the adhesion of sealant compositions to a wide variety of substrates are needed. Moreover, compositions and methods for improving the adhesion of sealant compositions which are continuously challenged by the elements are similarly needed.

SUMMARY OF THE INVENTION

In brief, it has been found that long chain esters formed by reacting mono, di-, and/or tri-carboxylic acids containing one, two, or three $C_6$–$C_{24}$ long chain radicals or fatty acid residues, and alcohols containing a $C_3$–$C_{24}$ alkyl group, when added with an adhesive resin, such as a melamine-containing resin or a phenol-, e.g., resorcinol-containing resin, e.g., a novolak resin, unexpectedly increases adhesion between a sealant, such as silicone sealants, butyl rubber sealants, acrylic sealants, urethane sealants, and modified urethane sealants, and a substrate, for example, glass substrates, metal substrates, ceramic substrates, polymeric substrates, cementitious materials such as concrete, asphaltic materials, and the like.

Surprisingly good adhesion between sealants and various substrates has been obtained by adding an adhesive resin and one or more long chain mono-, di-, and/or tri-esters, particularly dimerate esters reacted from $C_{18}$ fatty acids and $C_3$–$C_{24}$ alcohols, preferably $C_3$–$C_{18}$ alcohols, more preferably $C_6$–$C_{18}$ alcohols. Preferably, the esters provide unexpected, tenacious bonding between the sealants and the substrate, when combined with an adhesive resin. It is theorized that the long chain esters of the invention strongly adhere both to the sealant composition and to the resin, with the resin providing sufficient bonding to the substrate.

Examples of suitable substrates include metal surfaces such as steel surfaces, brass-coated steel surfaces, copper surfaces, brass surfaces and aluminum surfaces, glass surfaces, polymeric surfaces, cementitious surfaces such as concrete, asphaltic surfaces, and the like.

One aspect of the invention provides sealant compositions characterized by good adhesion to various substrates. Another aspect of the invention provides methods of adhering a sealant composition to a substrate.

DETAILED DESCRIPTION OF THE PREFERRED EMBODIMENTS

As used herein, the term "adhesion promoter system" refers to the combination of at least one long chain ester compound and at least one adhesive resin. The adhesion promoter systems of the invention are useful for improving the adhesion of sealant compositions to various substrates, particularly ceramic substrates such as concrete. Surprisingly, the adhesion promoter systems disclosed herein significantly increase the adhesion of the sealant compositions to such substrates. In the description, the terms "adhesion promoter system" and "adhesion promoter" may be used interchangeably.

As used herein, the terms "sealant" and "sealant composition" refers to a composition which can be extruded, dispensed, poured and/or otherwise applied to a substrate, and which is capable of subsequent hardening to form a permanent bond with the substrate. The sealant compositions of the invention typically comprise a sealant and an adhesion promoter system, as described herein. In an alternative embodiment, the sealant compositions of the invention comprise a sealant and a long chain ester, as described herein.

The sealant typically includes a polymer having a molecular weight low enough for ease of application, and a curing agent for the polymer. Typically the sealant polymer has a molecular weight between about 1000 grams/mol and about 1,000,000 grams/mol, preferably between about 2500 grams/mol and about 500,000 grams/mol, most preferably between about 5000 grams/mol and about 100,000 grams/mol.

After application of the sealant (or a sealant composition in accordance with the invention) to a substrate, the curing agent causes cross-linkages to form between the polymers, typically resulting in the in-situ formation of a cross-linked/branched polymeric material having an elastomeric-like consistency. However, waterborne sealants can include high molecular weight polymers, which are encapsulated in emulsion form, which allows for ease of flow for application to substrates. In such an emulsion sealant, a curing agent is typically not needed for development of desired physical properties.

Most sealants comprise synthetic polymers; however, sealants including natural polymers are also known. Representative synthetic sealant polymers in accordance with the invention include silicones, butyl rubbers, acrylics, urethanes, modified urethanes, and the like. Representative natural sealant polymers in accordance with the invention include putty (linseed oil based), asphalt, and various conventionally known waxes.

Typical representative sealants are provided below:

1. Silicone Sealants

Polymer: polydimethylsiloxane.

Curing agents: acetoxy silanes, methyltrimethoxysilane, N-methylacetamidosilanes, and ethylorthosilicate.

Additives: titanate catalysts, dibutyltindiacetate, and dibutyltindilaurate.

Fillers: fumed silica, calcium carbonate, and ground silica.

Conventionally known adhesion promoters: alkoxyaminosilanes, alkoxydiamino functionalized silanes, alkoxyacetoxy functionalized silanes, epoxy functionalized silanes, and isocyanurate functionalized silanes.

2. Butyl Rubber Sealants

Polymer: poly(isoprene-co-isobutylene-co-divinylbenzene).

Fillers: silica and carbon black.

3. Acrylic Sealants

Polymer: poly(methyl methacrylate-co-butyl acrylate).

Fillers: calcium carbonate.

Conventionally known adhesion promoters: amino functionalized silanes.

4. Urethane Sealants

Polymer: reaction product of an amine or alcohol functionalized polyether with a diisocyanate.

Curing agent: diisocyanates.

Additives: plasticizers, UV absorbers, dibutylphthalate, dibenzylphthalate, butylbenzylphthalate, carbon black, titanium dioxide.

Fillers: calcium carbonate.

Conventionally known adhesion promoters: amino functionalized silanes.

5. Modified Urethane Sealants

Polymer: reaction product of a polyether, a diisocyanate and an amino functionalized silane or alkoxysilane terminated polyether.

Curing agent: alkoxy functionalized silanes (methyltrimethoxysilane, etc).

Catalyst: dibutyltindicarboxylate.

Fillers: calcium carbonate.

Additives: carbon black, titanium dioxide, plasticizers, UV absorbers, dibutylphthalate, dibenzylphthalate, and butylbenzylphthalate.

Conventionally known adhesion promoters: alkoxyaminosilanes, alkoxydiamino functionalized silanes, alkoxyacetoxy functionalized silanes, epoxy functionalized silanes, and isocyanurate functionalized silanes.

The sealant compositions of the invention can further include additives such as solvents, plasticizers, fillers, UV stabilizers, and other, conventional adhesion promoters. For example, in sealant compositions sensitive to U.V. light, such as sealant compositions including urethane sealants, additives to block U.V. radiation, or absorb UV radiation or free radicals generated by the UV radiation, are typically added. With many of the sealant compositions in accordance with the invention, conventionally known adhesion promoters are also added. Some sealant compositions contain pre-cured polymers that are swollen or dispersed in solvents. For example, sealants having large polymers, gums, waxes or pre-cured polymers dispersed in water in the form of an emulsion are known. In addition to many of the above types of ingredients and additives, emulsion-based sealants (and the inventive sealant compositions containing same) typically include one or more surfactants.

The inventive sealant compositions provide excellent adhesion to ceramic, glass, metal and polymeric substrates, and can be used to seal in and around bathroom fixtures, in storage areas, in vents, plumbing lines, flooring, vehicular wheel wells, sanitary and storm sewer manholes, irrigation and drainage system joints, septic tanks, underground vault seals (e.g., burial vaults), architectural foundation joints, in conjunction with o-rings (for example, in pipe joints), and the like. The sealant compositions in accordance with the invention are surprisingly weather-resistant, and therefore provide sealing and bonding products capable of use in the manufacturing and maintenance of pools, spas, vehicles and many other applications. For example, with respect to pools and spas, the sealant compositions can be used to seal joints around storage and hatch compartments, between joints on exterior substrates, and plumbing and electrical outlets. When used as a joint and gap sealant, the sealant compositions can protect these and other areas. Moreover, upon curing, the sealant compositions have excellent elastic properties and thus provide an effective seal for long periods of time.

The term "sealant composition" typically refers to the combination of a sealant and an adhesion promoter system in accordance with the invention. Alternatively, the term "sealant composition" can refer to the combination of a sealant and a long chain ester in accordance with the invention.

Typically, in the sealant compositions according to the invention, long chain esters are typically added to a sealant with an adhesive resin. According to one aspect of this embodiment, the adhesion promoter systems may be added to a sealant(s) as a liquid in order to promote adhesion of the sealant to a substrate. For example, the adhesive resin(s) and long chain ester(s) are solubilized in one or more suitable organic solvents. Alternatively, the adhesive resin(s) and long chain ester(s) can be emulsified in water with one or more suitable emulsifying agents to form a water-based emulsion.

The water-based emulsions should have an HLB value of about 4 to about 5 for best ester dispersion in the emulsion. In liquid form, the adhesion promoter has a number of advantages, particularly the ability to coat or pre-treat a substrate, such as a ceramic (e.g., concrete), metal or polymeric substrate, with the liquid ester/resin adhesion promoter for increased adherence of a sealant composition to the substrate. Other advantages include (1) the ability to prepare a relatively high concentration solution of the adhesion promoter, e.g., 50–90% by weight of the adhesion promoter, which can be diluted upon addition to a sealant composition or upon substrate coating; (2) the ability to include excess alcohol, e.g., 2-ethylhexanol, during the synthesis of the long chain ester portion of the liquid adhesion promoter, for use as a solvent for solubilizing the resin portion of the liquid adhesion promoter. The use of excess alcohol during the synthesis of the esters is particularly advantageous for ester synthesis since the esterification reaction proceeds faster with excess alcohol. Since the excess alcohol is useful in solubilizing the resin, the excess alcohol can remain with the synthesized ester without removing much, or any, of the excess alcohol in an ester concentration or purification step. The liquid adhesion promoter, whether solubilized in an organic liquid or emulsified in a water-based emulsion, can be added directly to the sealant composition for adhesion to a substrate, e.g., a metal, glass, ceramic, polymeric layer, film, or fibrous substrate, or can be used to pre-treat, e.g., coat, the substrate for adhering a representative sealant thereto.

In accordance with another embodiment of the present invention, it has also been found that the addition of one or more reactive organic solvents (reactive diluents) to the sealants compositions described herein, in addition to a solvent used to solubilize the adhesive resin, or as a replacement for any portion of the resin solvent or all of the resin solvent, unexpectedly increases the adhesion of the sealant composition to various substrates such as metal surfaces, e.g., steel surfaces, brass-coated steel surfaces, copper surfaces, brass surfaces and aluminum surfaces, glass surfaces, ceramic surfaces (e.g., concrete surfaces), polymeric surfaces and the like.

Examples of suitable reactive diluents include (1) glycidyl ethers, (2) diglycidyl ethers; (3) aliphatic, straight chain epoxides; (4) epoxidized vegetable oils, particularly epoxidized soybean oil; (5) cycloaliphatic epoxies; (6) glycidyl esters, and (7) diglycidyl esters.

(1) Glycidyl ethers generally have a structural formula as follows:

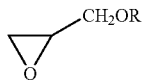

where R is alkyl (e.g., methyl, ethyl, butyl, isobutyl, and the like), alkyl containing one or more olefinic bonds, or aryl (e.g., phenyl, toluyl, benzyl, and the like). Such species include reaction products of epichlorohydrin with methanol, ethanol, isopropanol, n-butanol, 1-octanol, 2-ethylhexanol, n-decanol, isooctanol, isodecanol, oleyl alcohol, benzyl alcohol, or any other alcohol, as well as mixtures of alcohols, for example, a mixture of n-octyl and n-decyl.)

Examples include 2-ethylhexyl glycidyl ether; allyl glycidyl ether; dodecyl glycidyl ether; decyl glycidyl ether; iso-butyl glycidyl ether; n-butyl glycidyl ether; naphthyl glycidyl ether; tridecyl glycidyl ether; phenyl glycidyl either; 2-ethylhexyl glycidyl ether; $C_8$–$C_{10}$ aliphatic glycidyl ether; p-tertiarybutylphenyl glycidyl ether; nonylphenyl glycidyl ether; and phenyl glycidyl ether.

(2) Diglycidyl ethers generally have a structural formula as follows:

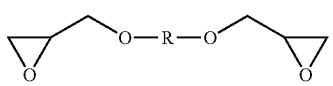

Where R is a straight chain or branched aliphatic moiety, for example $(CH_2)_n$, where $n=2–10$, e.g., $—CH_2—CH(CH_3)CH_2—$, $—CH_2—C(CH_3)_2—CH_2—$, and the like. These species include reaction products of epichlorohydrin with a diol or mixtures of diols, such as ethylene glycol, propylene glycol, 1,4-butylene glycol, 1,3-butylene glycol, 1,6-hexanediol, 2-methyl-1,3-propanediol, 2,2-dimethyl-1,3-propanediol, and mixtures thereof. R can also be an aromatic moiety, resulting in an epoxy structure that is the reaction product of glycidol with common bisphenols such as bisphenol A and bisphenol F.

Examples include 1,6-hexanediol diglycidyl ether; bisphenol A diglycidyl ether; neopentyl glycol diglycidyl ether; 1,4 butanediol diglycidyl ether; cyclohexanedimethanol diglydidyl ether; polypropylene glycol diglycidyl ether; polyethyleneglycol diglycidyl ether; dibromoneopentyl glycol diglycidyl ether; trimethylopropane triglycidyl ether; castor oil triglycidyl ether; propoxylated glycerin triglycidyl ether; and sorbitol polyglycidyl ether.

(3) Aliphatic, straight chain epoxides have a general structural formula as follows:

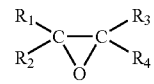

Examples include propylene oxide, butylene oxide, as well as the following:

| $R_1$ | $R_2$ | $R_3$ | $R_4$ |
|---|---|---|---|
| $CH_2$=CH | H | H | H |
| $C_3H_7$ | H | H | H |
| $(CH_3)_2CH$ | H | H | H |
| $C_5H_{11}$ | H | H | H |
| $C_6H_{13}$ | H | H | H |
| $(CH_3)_2CH(CH_2)_3$ | H | H | H |
| $C_8H_{17}$ | H | H | H |
| $C_{16}H_{33}$ | H | H | H |
| $C_{18}H_{37}$ | H | H | H |
| $C_6H_5$ | H | H | H |
| $C_6H_5CH_2$ | H | H | H |
| $C_6H_5(CH_2)_2$ | H | H | H |
| $C_6H_5(CH_2)_3$ | H | H | H |
| $C_5H_5(CH_2)_4$ | H | H | H |
| $CH_2OH$ | H | H | H |
| $CH_3OCH_2$ | H | H | H |
| $C_2H_5OCH_2$ | H | H | H |
| $C_3H_7CHOH$ | H | H | H |
| $C_6H_5OCH_2$ | H | H | H |
| $CH_3CO_2CH_2$ | H | H | H |
| $CH_2$=$CHCO_2CH_2$ | H | H | H |
| $CH_2$=$C(CH_3)$—$CO_2CH_2$ | H | H | H |
| $CH_3CH$=$CH$—$CO_2CH_7$ | H | H | H |
| Br | H | H | H |
| $CH_2F$ | H | H | H |
| $CH_2Cl$ | H | H | H |
| $CH_2Br$ | H | H | H |
| $CH_2I$ | H | H | H |
| $CF_3$ | H | H | H |
| $CCl_3$ | H | H | H |
| $(C_2H_5)_2NCH_2$ | H | H | H |
| $C_2H_5$ | H | $C_2H_5$ | H |
| $C_2H_5$ | H | $CF_3$ | H |
| $C_2H_5$ | H | $C_3F_7$ | H |
| $C_4H_9$ | H | $CH_2Br$ | H |
| $C_5H_{11}$ | H | Cl | H |
| $C_6H_5$ | H | $CH_3$ | H |
| $C_6H_5$ | H | $C_2H_5$ | H |
| $C_6H_5$ | H | $C_3H_7$ | H |
| $C_6H_5$ | H | $C_3H_7$(iso) | H |
| $C_6H_5$ | H | $C_6H_5CH_2$ | H |
| $CF_3$ | H | F | H |
| $CH_3$ | $CH_3$ | $CH_3$ | H |
| $CH_3$ | $C_2H_5$ | $CH_3$ | H |
| $CH_3$ | $CH_3$ | $C_3F_7$ | H |
| $CH_3$ | $CH_3$ | $CO_2C_2H_5$ | H |
| $CH_3$ | $CF_3$ | Cl | H |
| $C_2H_5$ | $C_2H_5$ | $OH_3$ | H |
| $CH_3$ | $CH_3$ | $CH_3$ | $CH_3$ |
| $CH_3$ | $CH_3$ | H | H |
| $CH_3$ | $CF_3$ | H | H |
| $CH_3$ | $C_2H_5$ | H | H |
| $CH_3$ | $C_3F_7$ | H | H |
| $C_2H_5$ | $CH_2Br$ | H | H |
| $C_6H_5$ | $CH_3$ | H | H |
| $C_6H_5(CH_2)_3$ | $CH_3$ | H | H |
| $C_6H_5$ | OH | H | H |
| Cl | Cl | H | H |
| $CH_3$ | H | $CH_3$(cis) | H |

| R₁ | R₂ | R₃ | R₄ |
|---|---|---|---|
| CH₃ | H | H | CH₃(trans) |
| CH₃ | H | C₂H₅(cis) | H |
| CH₃ | H | H | C₂H₆(trans) |
| CH₃ | H | C₃H₇ | H |
| CH₃ | H | C₃H₇(iso) | H |
| CH₃ | H | CF₃ | H |
| CH₃ | H | CH₂Br | H |
| CH₃ | H | C₃F₇ | H |
| CH₃ | H | CO₂H | H |

(4) Epoxidized oils such as epoxidized soybean oil, epoxidized linseed oil, epoxidized safflower oil, epoxidized corn oil, epoxidized cottonseed oil, epoxidized rapeseed oil, epoxidized peanut oil, and other similar species derived from the epoxidation of $C_{18}$-unsaturated esters of glycerin can also be used as the reactive diluent.

(5) Cycloaliphatic epoxides, such as 1,2-cyclohexene oxide, 1,2-cyclopentene oxide, 1,2,3,4,-diepoxybutene, vinylcyclohexene dioxide, and the like, as well as those products marketed by Shell Oil under the brand name EPON®, an example of which is shown below.

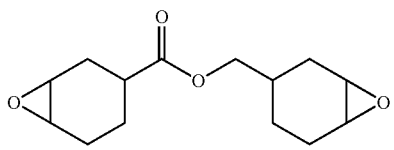

(6) Glycidyl esters generally have a structural formula as follows:

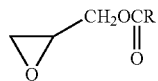

Where R is a straight chain aliphatic, such as $-(CH_2)_n-CH_3$ (wherein n=1–9) or branched aliphatic such as $-CH_2CH(CH_3)_2$, $-CH(CH_2CH_3)(CH_2)_4CH_3$, and the like. R can also be contain one or more olefinic bonds. R can also be aromatic, i.e., -phenyl or -toluyl. These glycidyl esters include reaction products of glycidol with carboxylic acids, such as acetic acid, propionic acid, isobutyric acid, 2-ethylhexoic acid, benzoic acid, toluic acid (various isomers), oleic acid, linoleic acid, linolenic acid, as well as mixtures of carboxylic acids. Preferably, the reaction with glycidol is with the methyl esters of the carboxylic acids (e.g., trans-esterification).

Examples include glycidyl neodecanoate; acetic acid glycidyl ester; butyric acid glycidyl ester; propionic acid glycidyl ester; valeric acid glycidyl ester; caproic acid glycidyl ester; capric acid glycidyl ester; caprylic acid glycidyl ester; lauric acid glycidyl ester; and glycidyl ester of linoleic acid or of linolenic acid.

(7) Diglycidyl esters generally have a structural formula as follows:

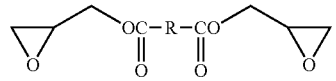

Where R is straight chain aliphatic $-(CH_2)_n$ wherein n is typically between 1 and 8, or branched aliphatic, or aliphatic/cycloaliphatic mixed, or aliphatic containing one or more olefinic bonds. R can also be aromatic. These diglycidyl esters include reaction products of glycidol with dicarboxylic acids such as malonic acid, glutaric acid, adipic acid, azelaic acid, sebacic acid, phthalic anhydride, isophthalic acid, terephthalic acid, and one or more dimer acids. Preferably, the reaction with glycidol is with the methyl esters of the carboxylic acids (e.g., trans-esterification).

In the reactive diluent embodiment described herein, the reactive diluent is typically included in an amount between about 0.5% and about 50% by weight, usually between about 5 wt. % and about 40 wt. %, and most preferably between about 10 wt. % and about 30 wt. %, based on the total weight of adhesion promoter (i.e., adhesive resin plus ester) in the composition. These reactive diluents function as solvents to compatibilize the sealant(s), adhesive resin, and long chain ester compositions described herein, and are believed to participate chemically in the adhesion of the sealant composition to the substrates described herein.

In another embodiment, the substrate can be pretreated with the adhesive resin component of the adhesion promoter system. The resin-treated substrate can subsequently be treated with the ester component of the adhesion promoter system for improved adherence of a sealant to a substrate. The resin-treated substrate can be ester treated in any manner, preferably by dipping or coating the resin-treated substrate with an organic solution of the ester or a water-based emulsion containing the ester. Alternatively, the ester component can be added to a sealant, for subsequent interaction with the resin treated substrate. According to this embodiment of the invention, the term "sealant composition" refers to a combination of a sealant and an ester having Formulas I, II, III, IV, and combinations thereof.

The adhesion promoter systems can also be mixed with a preferably inert, dry carrier, such as calcium silicate, to form an alternative delivery system, which can be incorporated into the sealant composition(s). In such systems, the dry, inert carrier facilitates delivery of the active adhesion promoting agents to the sealant(s) of the sealant composition.

For example, a representative adhesion promoter system utilizing a dry carrier, RX-13845, was prepared by adding preheated Cyrez CRA 138 resin liquid to a dry carrier contained in a mixing bowl, followed by addition of preheated RX-13804, a representative long chain ester in accordance with the invention. The materials were mixed at low speed for about 3 minutes. The materials were blended for an additional time period, approximately 3 minutes. RX-13845 is advantageous in that it permits liquids to be handled as powders. Because the active adhesion promoter is released from the carrier, incorporation of RX-13845 into a sealant composition allows the adhesion promoter to function in the same manner as if it had been incorporated into the sealant composition as a neat material.

In yet another refinement of the invention, the adhesion promoters may be formulated as a "polymer masterbatch." According to this aspect of the invention, a pellet comprising a masterbatch polymer (about 6 wt. % to about 20 wt. %), a filler or other similar inert ingredients (about 0 wt. % to about 14 wt. %), with the balance being an adhesion promoter system (i.e., at least one ester compound in accordance with formulas I-IV and at least one adhesive resin such as melamine) is added to a sealant to improve adhesion of the formed sealant composition to a substrate. Typically, the masterbatch polymer and the initial polymeric component of the sealant to which the masterbatch polymer is added are miscible. Preferably, the masterbatch polymer and the initial polymeric component of the sealant are the same.

Throughout the specification, the adhesion promoter systems are generally used in an amount between about 0.2% by weight and about 30% by weight, based on the weight of the sealant(s) in the sealant composition(s). Typically, the ester and adhesive resin components of an adhesion promoter system of the invention are both present in an amount between about 0.1% and about 15% by weight, usually between about 1 wt. % and about 10 wt. %, and most preferably between about 2 wt. % and about 8 wt. %, based on the weight of the sealant(s) in the sealant composition.

Ranges may be expressed herein as from "about" or "approximately" one particular value to "about" or "approximately" another particular value. When such a range is expressed, another embodiment includes the range from the one particular value to the other particular value. Similarly, when numerical values are expressed as approximations, e.g., by use of the antecedent "about," it will be understood that the particular value forms another embodiment.

The long chain esters may be monoesters, diesters, triesters, or mixtures thereof, that may include saturated or unsaturated hydrocarbon chains, straight chain or branched, having none, one, two or three double bonds in the hydrocarbon chains.

The monoesters have a formula I, as follows:

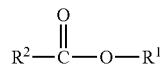

(I)

wherein $R^1$ is a $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and, $R^2$ is a $C_3$–$C_{24}$ hydrocarbon, preferably $C_6$–$C_{24}$ hydrocarbon, more preferably $C_8$–$C_{18}$ hydrocarbon, saturated or unsaturated having 1 to 6, preferably 1 to 3 carbon-to-carbon double bonds.

The diesters have a formula II or III, as follows:

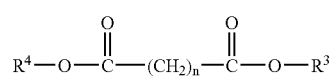

(II)

wherein n=3–24, preferably 6–18, and more preferably 3–10, and $R^3$ and $R^4$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds.

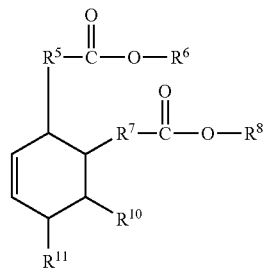

(III)

wherein $R^5$ and $R^7$, same or different, are $C_3$–$C_{24}$ alkyl, preferably $C_6$–$C_{24}$ alkyl, more preferably $C_8$–$C_{18}$ alkyl, straight chain or branched, either saturated or containing 1 to 6, preferably 1 to 3 carbon-to-carbon double bonds;

$R^6$ and $R^8$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{10}$ and $R^{11}$, same or different, are $C_3$–$C_{24}$ saturated hydrocarbon chains, preferably $C_3$–$C_{18}$ saturated hydrocarbon chains, more preferably $C_6$–$C_{18}$ saturated hydrocarbon chains, straight chain or branched; or unsaturated $C_3$–$C_{24}$ hydrocarbon chains, preferably $C_3$–$C_{18}$ unsaturated hydrocarbon chains, more preferably $C_6$–$C_{18}$ unsaturated hydrocarbon chains, straight chain or branched, containing 1 to 6, preferably 1 to 3 carbon-to-carbon double bonds.

The triesters have a formula IV, as follows:

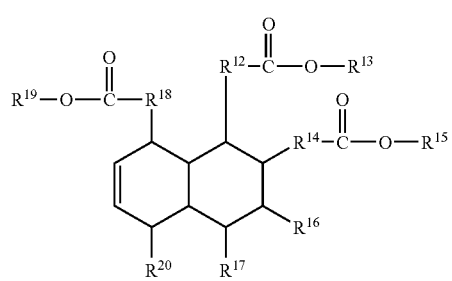

(IV)

wherein $R^{12}$, $R^{14}$ and $R^{18}$, same or different, are $C_3$–$C_{24}$ alkyl, preferably $C_6$–$C_{24}$ alkyl, more preferably $C_8$–$C_{18}$ alkyl, straight chain or branched, either saturated or containing 1 to 6, preferably 1 to 3 carbon-to-carbon double bonds;

$R^{13}$, $R^{15}$ and $R^{19}$, same or different, are $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds; and $R^{16}$, $R^{17}$ and $R^{20}$, same or different, are $C_3$–$C_{24}$ saturated hydrocarbon chains, preferably $C_3$–$C_{18}$ saturated hydrocarbon chains, more preferably $C_6$–$C_{18}$ saturated hydrocarbon chains, straight chain or branched; or unsaturated $C_3$–$C_{24}$ hydrocarbon chains, preferably $C_3$–$C_{18}$ unsaturated hydrocarbon chains, more preferably $C_6$–$C_{18}$ unsaturated hydrocarbon chains, straight chain or branched, containing 1 to 6, preferably 1 to 3 carbon-to-carbon double bonds.

The fatty acid residues or hydrocarbon chains $R^2$, $R^5$, $R^7$, $R^{12}$, $R^{14}$ and $R^{18}$ of the esters of formulas I, II, III, and IV can be any $C_3$–$C_{24}$ hydrocarbon chain, preferably any $C_6$–$C_{24}$ hydrocarbon chain, more preferably any $C_8$–$C_{18}$ hydrocarbon chain, either saturated or containing 1 to 6, preferably 1 to 3 carbon-to-carbon double bonds, and can be derived from animal or vegetable fatty acids such as butter; lard; tallow; grease; herring; menhaden; pilchard; sardine; babassu; castor; coconut; corn; cottonseed; jojoba; linseed; oiticica; olive; palm; palm kernel; peanut; rapeseed; safflower; soya; sunflower; tall; and/or tung. Examples are the hydrocarbon chain residues from the following fatty acids, where the number in parentheses indicates the number of carbon atoms, and the number of double bonds, e.g., $(C_{24-6})$ indicates a hydrocarbon chain having 24 carbon atoms and 6 double bonds: Hexanoic $(C_{6-0})$; Octanoic $(C_{8-0})$; Decanoic $(C_{10-0})$; Dodecanoic $(C_{12-0})$; 9-Dodecenoic (CIS) $(C_{12-1})$; Tetradecanoic $(C_{4-0})$; 9-Tetradecenoic (CIS) $(C_{14-1})$; Hexadecanoic (CIS) $(C_{16-0})$; 9-Hexadecenoic (CIS) $(C_{16-1})$; Octadecanoic $(C_{18-0})$; 9-Octadecenoic (CIS) $(C_{18-1})$; 9-Octadecenoic, 12-Hydroxy-(CIS) $(C_{18-2})$; 9, 12-Octadecadienoic (CIS, CIS) $(C_{18-2})$; 9, 12, 15 Octadecatrienoic (CIS, CIS, CIS) $(C_{18-3})$; 9, 11, 13 Octadecatrienoic (CIS, TRANS, TRANS) $(C_{18-3})$; 9, 11, 13 Octadecatrienoic, 4-Oxo (CIS, TRANS, TRANS) $(C_{18-3})$; Octadecatetrenoic $(C_{18-4})$; Eicosanoic $(C_{20})$; 11-Eicosenoic (CIS) $(C_{20-1})$; Eicosadienoic $(C_{20-2})$; Eicosatrienoic $(C_{20-3})$; 5, 8, 11, 14 Eicosatetraenoic $(C_{20-4})$; Eicosapentaenoic $(C_{20-5})$; Docosanoic $(C_{22})$; 13 Docosenoic (CIS) $(C_{22-1})$; Docosatetraenoic $(C_{22-4})$; 4, 8, 12, 15, 19 Docosapentaenoic $(C_{22-5})$; Docosahexaenoic $(C_{22-6})$; Tetracosenoic $(C_{24-4})$; and 4, 8, 12, 15, 18, 21 Tetracosahexaenoic $(C_{24-6})$.

Examples of particularly useful diesters of formula II include a saturated diester formed by the reaction of sebacic acid and 2-ethylhexyl alcohol:

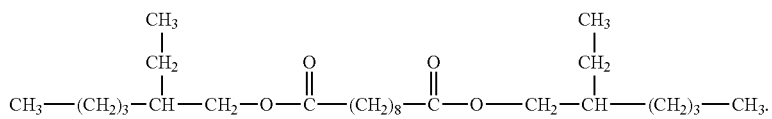

Other useful diesters falling within formula II include the saturated diester formed by the reaction of sebacic acid with tridecyl alcohol,

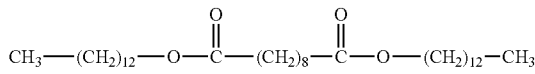

and the unsaturated diester formed by reaction of sebacic alcohol with oleyl alcohol:

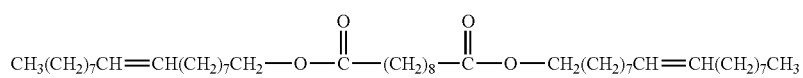

Useful cyclic diesters falling within formula III include dimerate ester structures formed by the reaction of a $C_{36}$ dimer acid derived from tall oil fatty acids and $C_3$–$C_{24}$, preferably $C_3$–$C_{18}$, more preferably $C_6$–$C_{18}$ alcohol, straight chain or branched, saturated or unsaturated containing 1 to 3 carbon-to-carbon double bonds. Examples of such cyclic esters include the following structures, wherein the dimer acid corresponding to structure A is formed by self reaction of linoleic acid, the dimer acid corresponding to structure B is formed by reacting linoleic acid with oleic acid, and the dimer acid corresponding to structure C is formed by reacting linoleic acid with linolenic acid:

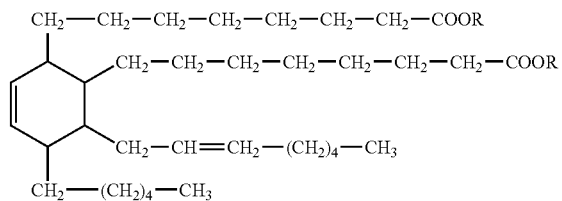

(A);

-continued

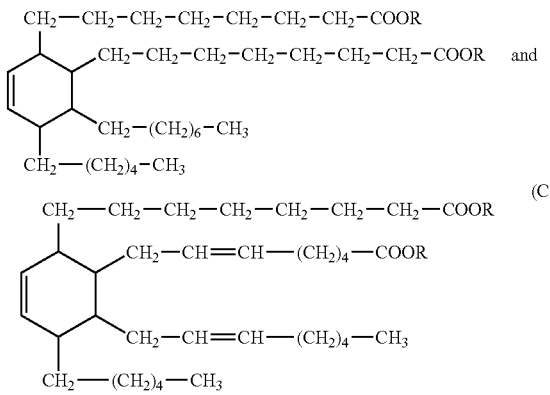

wherein each R, same or different, in formulas (A), (B), and (C) is a $C_3$–$C_{24}$ alkyl, preferably $C_3$–$C_{18}$ alkyl, more preferably $C_6$–$C_{18}$ alkyl, straight chain or branched, saturated or unsaturated containing 1 to 3 carbon-to-carbon double bonds. Another example of a useful unsaturated diester (dimerate ester) is formed by the reaction of a predominantly $C_{36}$ dimer acid reacted with 2-ethylhexyl alcohol. An additional useful unsaturated diester (dimerate ester) is formed by the reaction of a predominantly $C_{36}$ dimer acid with tridecyl alcohol.

A representative example of the triester (trimerate ester) of formula IV is the following structure (D):

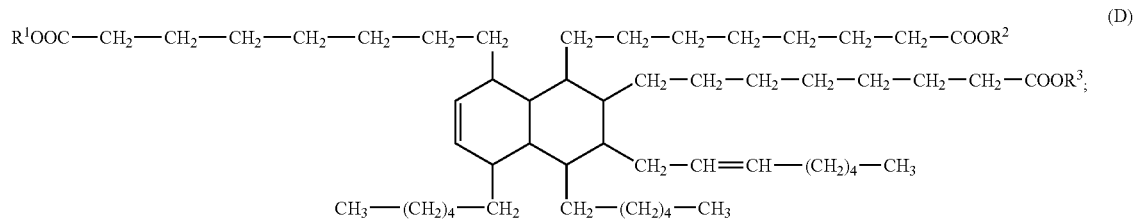

wherein each $R^1$, $R^2$, and $R^3$, same or different, is a $C_3$–$C_{24}$ radical, preferably $C_3$–$C_{18}$, more preferably $C_6$–$C_{18}$, straight chain, or branched, saturated or unsaturated containing 1 to 3 carbon-to-carbon double bonds.

A particularly useful blend of long chain esters is formed from blends of mono, dimer, and trimer acids, for example, products having CAS# 61788-89-4. Esters prepared from such products are blends including, primarily, the above $C_{36}$ and $C_{54}$ dimerate and trimerate esters (A), (B), (C) and (D), shown in the above structures, that is predominantly (more than 50% by weight) the $C_{36}$ dimerate esters (A), (B) and (C).

Commercially available blends of useful polybasic acids that can be reacted with $C_3$–$C_{24}$, preferably $C_3$–$C_{18}$, more preferably $C_6$–$C_{18}$ alcohols, straight chain or branched, saturated or unsaturated containing 1 to 3 carbon-to-carbon double bonds to produce the dimerate and trimerate esters, as blends, include the following: EMPOL® 1010 Dimer Acid; EMPOL® 1014 Dimer Acid; EMPOL® 1016 Dimer Acid; EMPOL® 1018 Dimer Acid; EMPOL® 1022 Dimer Acid; EMPOL® 1024 Dimer Acid; EMPOL® 1040 Trimer Acid; EMPOL® 1041 Trimer Acid; EMPOL® 1052 Poly- basic Acid; and similar PRIPOL™ products from Uniqema as well as UNIDYME® products from Arizona Chemical.

Particularly useful long chain ester additives are made by reacting any of the long chain mono, dimer and/or trimer acids with one or more straight chain or branched $C_3$–$C_{24}$, preferably $C_3$–$C_{18}$, more preferably $C_6$–$C_{18}$ alcohols to produce the esters of formulas I, II, III and IV. The above dimer, trimer, and polybasic acids are produced by dimerizing, trimerizing, and polymerizing (oligomerizing) long chain carboxylic acids, particularly from the above-mentioned tall oil fatty acids. Tall oil fatty acids are often mixtures. Accordingly, the dimer acid produced by dimerizing a $C_{18}$ carboxylic acid (typically, a mixture of stearic, oleic, linoleic, and linolenic), after esterification, typically provides a blend of numerous dimerate and trimerate esters in accordance with formulas III and IV, including saturated and unsaturated esters (i.e., some long chain esters may contain hydrocarbon chains having 1 to 6, generally 1 to 3, carbon-to-carbon double bonds). Any one, or any blend, of the esters of formulas I, II, III and/or IV, when combined with an adhesive resin, will function to increase the adhesion of a sealant composition in accordance with the invention to substrates such as ceramic substrates (e.g., concrete), glass substrates, metal substrates such as metal flat stock materials, polymeric substrates including substrates comprising natural and/or synthetic rubbers and substrates comprising thermoplastic polymeric materials.

Ceramic substrates include silicon, silicon oxide, and/or complex compounds conventionally known as silicates. Suitable ceramic substrates include structural clay products such as bricks and tiles, whitewares such as dinnerware and porcelain, all types of glass products, porcelain enamels, products including Portland cement, lime, plaster, and/or gypsum, abrasive materials such as fused silica and silicon carbide, and aluminum silicate fibers.

Suitable substrates comprising synthetic rubbers include homopolymers of conjugated diene compounds, such as isoprene, butadiene, chloroprene and the like, for example, polyisoprene rubber (IR), polybutadiene rubber (BR), polychloroprene rubber and the like; copolymers of the above described conjugated diene compounds with vinyl compounds, such as styrene, acrylonitrile, vinyl pyridine, acrylic acid, methacrylic acid, alkyl acrylates, alkyl methacrylates and the like, for example, styrene-butadiene copolymeric rubber (SBR), vinylpyridine-butadiene-styrene copolymeric rubber, acrylonitrile-butadiene copolymeric rubber, acrylic acid-butadiene copolymeric rubber, methacrylic acid-butadiene copolymeric rubber, methyl acrylate-butadiene copolymeric rubber, methyl methacrylate-butadiene copolymeric rubber, acrylonitrile-butadiene-styrene terpolymer, and the like; copolymers of olefins, such as ethylene, propylene, isobutylene and the like with dienes, for example isobutylene-isoprene copolymeric rubber (IIR); copolymers of olefins with non-conjugated dienes (EPDM), for example, ethylene-propylene-cyclopentadiene terpolymer, ethylene-propylene-5-ethylidene-2-norbornene terpolymer and ethylene-propylene-1,4-hexadiene terpolymer; polyalkenamer obtained by ring opening polymerization of cycloolefins, for example, polypentenamer; rubbers obtained by ring opening polymerization of oxirane ring, for example, polyepichlorohydrin rubber and polypropylene oxide rubber which can be vulcanized with sulfur, silicone rubbers, and the like. Furthermore, halides of the above-described various rubbers, for example, chlorinated isobutylene-isoprene copolymeric rubber (Cl-IIR), brominated isobutylene-isoprene copolymeric rubber (Br-IIR), fluorinated polyethylene, and the like are included. Of course, the adhesion promoters of the invention can be used to adhere sealant compositions to other rubbers. All these rubbers may be kneaded with compounding agents conventionally used for compounding with rubber, for example, fillers, such as carbon black, silica, calcium carbonate, lignin and the like, softening agents, such as mineral oils, vegetable oils, prior to vulcanization and then vulcanized.

Suitable substrates can also comprise thermoplastic polymeric materials. Such materials generally include synthetic high polymers that soften when exposed to heat and return to their original state when cooled to room temperature. More specifically, sealant compositions in accordance with the invention can be adhered to various thermoplastic polymeric material substrates using the adhesion promoter systems described herein, including substrates comprising polyvinyl chloride, nylons, propylene/α-olefin copolymers, polyolefins such as polyethylene and polypropylene, substituted polyolefins such as polyvinylidene fluoride, ethylene/α-olefin copolymers such as, for example, ethylene/propylene copolymers and ethylene/1-octene copolymers, polyurethane prepolymers, polystyrenes such as styrene/ethylene block copolymers, hydrogenated styrene/butadiene block copolymers, and acrylonitrile/butadiene/styrene terpolymers (ABS), cellulosic resins, acrylic resins, and combinations thereof. Other suitable polymeric substrates include thermosetting resins such as phenol/formaldehyde, melamine/formaldehyde, and the like.

The adhesion promoters include an adhesive resin, which preferably is a condensation product of a formaldehyde or methylene donor and a formaldehyde or methylene acceptor, either pre-condensed, or condensed in-situ while in the sealant composition. The term "methylene donor" is intended to mean a compound capable of reacting with a methylene acceptor (such as resorcinol or its equivalent containing a reactive hydroxyl group) and generate the resin outside of the sealant composition, or in-situ. Preferably, the components of the condensation product include a methylene acceptor and a methylene donor. The most commonly employed methylene acceptor is a phenol, such as resorcinol, while the most commonly employed methylene donor is a melamine, such as N-(substituted oxymethyl)melamine.

Examples of methylene donors which are suitable for use in the sealant compositions disclosed herein include melamine, hexamethylenetetramine, hexaethoxymethylmelamine, hexamethoxymethylmelamine, lauryloxymethyl-pyridinium chloride, ethoxy-methylpyridinium chloride, trioxan hexamethoxy-methylmelamine, the hydroxy groups of which may be esterified or partly esterified, and polymers of formaldehyde, such as paraformaldehyde: In addition, the methylene donors may be N-substituted oxymethylmelamines, of the general formula:

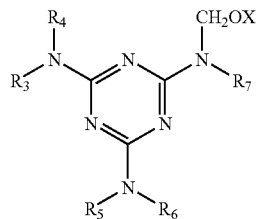

wherein X is an alkyl having from 1 to 8 carbon atoms $R^3$, $R^4$, $R^5$, $R^6$ and $R^7$ are individually selected from the group consisting of hydrogen, an alkyl having from 1 to 8 carbon atoms and the group —$CH_2OX$. Specific methylene donors include hexakis(methoxymethyl)melamine; N,N', N''trimethyl/N,N',N''-trimethylol-melamine; hexamethylolmelamine; N,N',N''-dimethylolmelamine; N-methylolmelamine; NN'-dimethylolmelamine; N,N',N''-tris (methoxymethyl)melamine; and N,N',N''-tributyl-N,N',N''-trimethylol-melamine. The N-methylol derivatives of melamine are prepared by known methods.

The amount of methylene donor and methylene acceptor, pre-condensed or condensed in-situ, that are present in the sealant composition may vary. Typically, the amount of pre-condensed methylene donor and methylene acceptor is present will range from about 0.1 wt. % to about 15.0 wt. %; or each can be added separately in an amount of about 1 wt. % to about 10.0 wt. %, based on the weight of sealant in the sealant composition. Preferably, the amount of each of a methylene donor and methylene acceptor added for in-situ condensation ranges from about 2.0 wt. % to about 8.0 wt. %, based on the weight of sealant in the sealant composition. The weight ratio of methylene donor to the methylene acceptor may vary. Generally speaking, the weight ratio will range from about 1:10 to about 10:1. Preferably, the weight ratio ranges from about 1:3 to 3:1.

Resorcinol-free adhesive resins also are useful in the sealant compositions described herein. For example, resorcinol-free adhesive resins and adhesive compounds useful in the adhesion promoter systems (i.e., when combined with the long chain esters described herein) include those described in U.S. Pat. Nos. 5,891,938 and 5,298,539, both hereby incorporated by reference. The '938 patent discloses a self-condensing alkylated triazine resin having high imino and/or methylol functionality. U.S. Pat. No. 5,298,539 discloses additives which are substituted derivatives based on cyclic nitrogen compounds such as melamine, acetoguanamine, cyclohexylguanamine, benzoguanamine, and similar alkyl, aryl or aralkyl substituted melamines, glycoluril and oligomers of these compounds. In particular, the adhesive resins and adhesive compounds which are useful as the adhesive resins in the sealant compositions described herein include the following: adhesive resins selected from the group consisting of derivatives of melamine, acetoguanamine, benzoguanamine, cyclohexylguanamine and glycoluril monomers and oligomers of these monomers, which have been substituted on average at two or more positions on the monomer or on each unit of the oligomer with vinyl terminated radicals, the sealant composition being free of resorcinol; and, these derivatives which have been further substituted on average at one or more positions with a radical which comprises carbamylmethyl or amidomethyl.

Further, the adhesive resin can be any of the compounds of the following formulas:

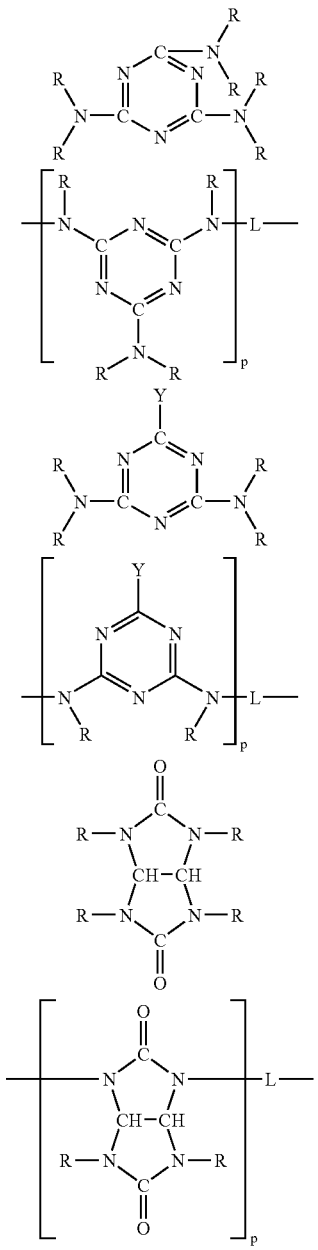

and positional isomers thereof,
wherein, in each monomer and in each polymerized unit of the oligomers, Y is selected
from methyl, phenyl and cyclohexyl, and, on average, at least two R are —CH$_2$—R$^1$,
and any remaining R are H, and
at least 2 R$^1$ are radicals selected from:

CH$_2$=C(R$_2$)—C(O)—O—,

CH$_2$=C(R$^2$)—C(O)—Z,

CH$_2$=C(R$^2$)—C(O)—NH—, and

CH$_2$=C(R$^2$)—CH$_2$—O—, wherein R$^2$ is hydrogen or C$_1$–C$_{18}$ alkyl, and Z is a radical selected from:

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and
R$_4$ is a C$_1$–C$_{18}$ alkyl, alicyclic, hydroxyalkyl, alkoxyalkyl or aromatic radical, and in the oligomers,
P is 2 to about 10, and
L is methylene or the radical

—CH$_2$—O—CH$_2$—.

These adhesive compounds are particularly useful, wherein on average at least one R$^1$ in each monomer or in each oligomerized unit is —NH—(O)—OR$^4$, particularly the compounds of the following formulas:

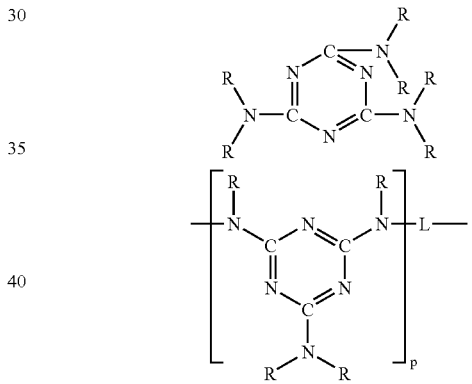

Particularly useful adhesive resins include the above formulas wherein on average, at least one R radical in each monomer or in each oligomerized unit is

—CH$_2$—NH—C(O)—OR$^4$, wherein R$^4$ is a C$_1$–C$_{18}$ alkyl, alicyclic, hydroxyalkyl, alkoxyalkyl or aromatic radical, and wherein, on average, at least two R radicals are selected from

CH$_2$=C(CH$_3$)—C(O)O—C$_3$H$_6$—O—CH$_2$— and

CH$_2$=CH$_2$—C(O)O—C$_2$H$_4$—O—CH$_2$— and at least one R radical is selected from

—CH$_2$—NH—C(O)—O—CH$_3$, and

—CH$_2$—NH—C(O)—O—C$_3$H$_7$.

These adhesive resins and compounds can include additional additives, particularly those selected from hydroxymethylated and alkoxymethylated (alkoxy having 1–5 carbon atoms) derivatives of melamine, acetoguanamine, benzoguanamine, cyclohexylguanamine and glycoluril and their oligomers.

Additional adhesive resins useful in the sealant compositions described herein include self-condensing alkylated triazine resins selected from the group consisting of (i), (ii), and (iii):

(i) a self-condensing alkylated triazine resin having at least one of imino or methylol functionality and represented by the formula (I)

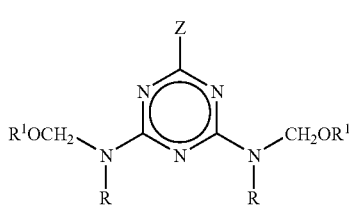

(ii) an oligomer of (i), or
(iii) a mixture of (i) and (ii), wherein
Z is —N(R)(CH$_2$OR$^1$), aryl having 6 to 10 carbon atoms, alkyl having 1 to 20 carbon atoms or an acetyl group,
each R is independently hydrogen or —CH$_2$OR$^1$, and
each R$^1$ is independently hydrogen or an alkyl group having 1 to 12 carbon atoms,
provided that at least one R is hydrogen or —CH$_2$OH and at least one R$^1$ is selected from the alkyl group; and
wherein the sealant composition is substantially free of methylene acceptor coreactants.

These adhesive resins are particularly useful wherein at least one R group is hydrogen and/or wherein at least one R$^1$ group is a lower alkyl group having 1 to 6 carbon atoms, particularly where the adhesive resin is a derivative of melamine, benzoguanamine, cyclohexylguanamine, or acetoguanamine, or an oligomer thereof One particularly useful alkylated triazine adhesive resin of the above formula is wherein Z is —N(R)(CH$_2$OR$^1$).

Another manner of eliminating resorcinol in an adhesive resin for sealant compositions disclosed herein, is to use N-(substituted oxymethyl)melamine and at least one of α- or β-naphthol. This adhesive resin employs the monohydric phenols, α- or β-naphthol, as methylene acceptors in the resin forming reaction in the absence of resorcinol.

Other adhesive resins useful in the sealant compositions described herein include special latices such as, for example, a vinyl-pyridine latex (VP latex) which is a copolymer of about 70 wt. % butadiene, about 15 wt. % styrene and about 15 wt. % 2-vinylpyridine; acrylonitrile rubber latices; and styrene-butadiene rubber latices. These can be used as such or in combination with one another. Another suitable adhesive resin useful herein, particularly for polyesters, are those which are applied in multi-stage processes, for instance a blocked isocyanate being applied in combination with polyepoxide and the material then being treated using customary resorcinol-formaldehyde resins (RFL dip). Additional useful adhesive resins include combinations of RFL dips with other adhesion-promoting substances such as, for example, a reaction product of triallyl cyanurate, resorcinol and formaldehyde or p-chlorophenol, resorcinol and formaldehyde.

Other suitable adhesive resins include polyurethane resins, epoxy resins, phenol aldehyde resins, polyhydric phenol aldehyde resins, phenol furfural resins, xylene aldehyde resins, urea formaldehyde resins, melamine formaldehyde resins, alkyd resins, polyester resins, and the like.

Typically, in the adhesion promoter systems, at least one ester compound in accordance with formulas I–IV is combined with an adhesive resin in a weight ratio between about 10 parts ester to about 1 part adhesive resin (i.e., a ratio of about 10:1, ester to resin, respectively) and about 1 part ester to about 10 parts resin (i.e., a ratio of about 1:10, ester to resin, respectively). More preferably, the esters are combined with an adhesive resin in a weight ratio between about 4 parts ester to about 1 part adhesive resin and about 1 part ester to about 4 parts resin. Most preferably, the ratio of ester to adhesive resin is approximately one to one.

As previously described, the adhesion promoter systems can be used to adhere sealant compositions to various substrates. The sealant compositions described herein are characterized in that the surfaces of the sealant compositions are improved to provide a high adhering ability to various substrates.

The sealants and sealant compositions described herein can be compounded by methods generally known, such as mixing the sealants and/or sealant compositions with various commonly used additive materials such as, for example, processing additives, such as oils, resins including tackifying resins and plasticizers, fillers, pigments, fatty acids, waxes and antioxidants.

As previously described, the sealant compositions of the invention can be used in numerous applications, including bonding concrete dividers, e.g., a composite structure including first and second concrete dividers, and a sealant composition in accordance with the invention therebetween. The adhesion promoters described herein are very effective in promoting bonding between sealant compositions and concrete substrates, where conventional adhesive pretreatment has been largely ineffective. For example, the adhesion promoter systems can be used to provide unexpectedly strong binding between a silicone sealant composition in accordance with the invention and a concrete substrate.

The invention may be better understood by reference to the following examples in which parts and percentages are by weight unless otherwise indicated.

EXAMPLES

Table I compares the effectiveness of sealant compositions in accordance with the invention (i.e., including adhesion promoter systems, here the exemplified adhesion promoter systems comprise dimerate esters) in promoting adhesion to various substrates with conventional sealants. More specifically, representative adhesion promoters were evaluated for promoting the adhesion of a silicone-based sealant composition, a urethane-based sealant composition, and an acrylic-based sealant composition to various substrates such as concrete, EPDM rubber, glass, polyvinylidene fluoride (available as Kynar® PVDF resin from ATOFINA Chemicals, Philadelphia, Pa.), and polyvinyl chloride. In each sealant study, five substrates were used and each was cleaned: glass with isopropanol/water, PVC with n-hexane, EPDM with toluene, Kynar® with acetone. (Solvent was applied and wiped off.) Concrete was cleaned by brushing under running water.

Adhesion was examined under the following conditions: (1) dry; (2) after 7 days immersion in water at 50° C.; and (3) after 17 days immersion in water at 50° C. The sealant compositions were investigated according to the following protocol: (1) "control" indicates that no adhesion promoter in accordance with the invention was added to the conventionally known sealant; (2) "primed" indicates that the substrate was primed (or coated) with a liquid adhesion promoter system ("APS") prior to application of the sealant (e.g., 85% APS, 15% 2-EH, e.g., RX-13928); (3) "resin on silica" indicates that the APS was mixed with a silica support (e.g., RX-13946) and added to provide a sealant composition as a powder; (4) "resin only" indicates that a liquid APS (85% APS, 15% 2-EH, e.g., RX-13928) was added to provide the sealant composition; and, (5) "heat activated resin on silica" indicates that the APS on silica support (as above, e.g., RX-13946) was heated at 140° C. for two minutes before addition to provide the sealant composition.

In experiments where the substrate was treated with APS as a primer, the APS was applied with a cotton ball and wiped to remove excess of primer. The primer system (e.g., APS in 2-ethylhexanol) was allowed to dry at room temperature for 24 hrs prior to application of the sealant.

In experiments where the APS was added directly to the sealant, the mixing of the APS/2-ethylhexanol or APS/silica into the various sealants was accomplished using a double centrifugal mixer (Flacktek, Inc., North Carolina). 90 grams of the total mixture (sealant+APS) was used for each run and the 90 grams was mixed at least three times for about 30 seconds each time. In all such cases, the shear forces caused the sealant mixture to become warm-to-hot. After mixing, the cap of the mixing container was removed and a plastic film was pushed down onto the sealant surface to protect it from moisture and air present in the head space. The cap was then placed back on the container and the mixture was allowed to equilibrate for at least one day before it was applied to a substrate.

The substrates were all one inch wide by three inches long. One end of each substrate was covered with ¾" wide Scotch® Tape to provide a non-adhered tab to pull and the sealant composition was applied as a smear approximately ⅛" thick over the entire length of the substrate. The sealant composition was allowed to cure under the conditions indicated in the data table and then tested for adhesion by pulling on the tab at a 90 degree angle to the surface. Only a fraction of an inch was pulled each time, allowing several test measurements to be made from each sample. Adhesion was rated using a scale from 0 to 5, as described in more detail below.

According to the examples, the APS was added at about 2 wt. % active APS, except for the heat activated resin on silica, which was added at about 3 wt. % active APS. As used herein the term "active APS" indicates that the APS content has been adjusted for solvent content and/or carrier (e.g., silica) content. For example, APS containing 15 wt. % solvent (e.g., RX-13928) was added at approximately 2.0/0.85=2.35 wt. %, based on weight of the sealant in the sealant composition.

The results demonstrate a significant improvement in the adhesion of the exemplified silicone-based, urethane-based, and acrylic-based sealant compositions to various substrates, particularly to concrete after 17 days immersion in water at 50° C. The results also demonstrate a significant improvement in the adhesion of the urethane-based sealant compositions to EPDM, glass, Kynar, and polyvinyl chloride substrates, particularly after 17 days immersion in water at 50° C.

The following legend should be used to interpret the data: 5 indicates cohesive failure; 4 indicates mixed adhesive/cohesive failure; 3 indicates strong adhesion but adhesive failure; 2 indicates moderate adhesion; 1 indicates weak adhesion; and, 0 indicates that the sealant composition nearly falls off of the substrate following curing.

The data is set forth in Table I, Examples 1–5, Table II, Examples 6–10, and Table II, Examples 11–15.

TABLE I

Sealant: Silicone sealant, amide cured

| | Example 1 | | | Example 2 | | | Example 3 | | | Example 4 | | | Example 5 | | |
|---|---|---|---|---|---|---|---|---|---|---|---|---|---|---|---|
| | Concrete substrate | | | EPDM substrate | | | Glass substrate | | | Kynar ® substrate | | | PVC substrate | | |
| | dry | 7d wet | 17d wet | dry | 7d wet | 17d wet | dry | 7d wet | 17d wet | dry | 7d wet | 17d wet | dry | 7d wet | 17d wet |
| control (sealant only) | 5 | 5 | 4 | 5 | 5 | 5 | 5 | 5 | 5 | 3 | 5 | 5 | 5 | 5 | 5 |
| primed | 5 | 5 | 5 | 5 | 5 | 5 | 5 | 5 | 5 | 5 | 5 | 3 | 5 | 5 | 5 |
| heat activated resin on SiO2 (silica) | 5 | no data | 5 | 5 | no data | 5 | 5 | no data | 5 | 5 | no data | 5 | 5 | no data | 5 |

TABLE II

Sealant: Urethane sealant, diisocyanate cured

| | Example 6 Concrete substrate | | | Example 7 EPDM substrate | | | Example 8 Glass substrate | | | Example 9 Kynar® substrate | | | Example 10 PVC substrate | | |
|---|---|---|---|---|---|---|---|---|---|---|---|---|---|---|---|
| | dry | 7d wet | 17d wet | dry | 7d wet | 17d wet | dry | 7d wet | 17d wet | dry | 7d wet | 17d wet | dry | 7d wet | 17d wet |
| control (sealant only) | 5 | 3+ | 3 | 1 | 3 | 5 | 5 | 2 | 3 | 2 | 2 | 4 | 2 | 2 | 3 |
| primed | 5 | 2 | 3 | 1 | 5 | 5 | 1 | 2 | 2 | 2 | 3 | 3 | 3 | 3 | 4 |
| resin only | 3 | 5 | 5 | 1 | 5 | 5 | 5 | 5 | 5 | 2 | 5 | 5 | 2 | 4 | 5 |
| heat activated resin on SiO2 (silica) | 3 | no data | 4 | 2 | no data | 3 | 5 | no data | 3 | 2 | no data | 2 | 2 | no data | 3 |

TABLE III

Sealant: Acrylic latex sealant

| | Example 11 Concrete substrate | | | Example 12 EPDM substrate | | | Example 13 Glass substrate | | | Example 14 Kynar® substrate | | | Example 15 PVC substrate | | |
|---|---|---|---|---|---|---|---|---|---|---|---|---|---|---|---|
| | dry | 7d wet | 17d wet | dry | 7d wet | 17d wet | dry | 7d wet | 17d wet | dry | 7d wet | 17d wet | dry | 7d wet | 17d wet |
| control (sealant only) | 3 | 5 | 4 | 0–1 | 1 | 1 | 1–2 | 2 | 0 | 2 | 2 | 1 | 2 | 3 | 0 |
| resin on SiO2 (silica) | 5 | 5 | 4 | 0–1 | 1 | 1 | 0–1 | 1 | 0 | 1 | 1 | 1 | 0–1 | 0 | 0 |
| resin only | 5 | 5 | 5 | 0–1 | 1 | 1 | 1–2 | no data | 0 | 2 | 4 | 4 | 0–1 | 1 | 1 |
| heat activated resin on SiO2 (silica) | 5 | no data | 5 | 0–1 | no data | 1 | 1 | no data | 0 | 3 | no data | 1 | 0–1 | no data | 0 |

TABLE IV

Materials for Tables I-III

| Material | Chemical Description | Supplier |
|---|---|---|
| Silicone sealant, amide cure | Calcium carbonate filled silicone sealant that cures with n-methylacetamide and n,n-diethylaminoethanol as the leaving groups; this system uses no catalyst | Dow Corning |
| Urethane sealant, diisocyanate cure | Typical urethane with polyetherbackbone polymeric system, a diisocyanate cure with calcium carbonate filler, plasticizer, and additives for UV protection and adhesion | Sonneborn |
| Acrylic latex sealant | Acrylic latex sealant, calcium carbonate filled | DAP |
| Cyrez® CRA-138M | Melamine Formaldehyde Resin | Cytec |
| RX-13928 | RX-13804-42.5%, Resimene 3520, 42.5%, 2EH-15% | The C. P. Hall Company |
| RX-13946 | Micro Cel E CSF 28%, RX13804, 36% Resimene 3520 36% | The C. P. Hall Company |
| RX-13845 | Micro Cel E CSF 28%, RX13804, 36% Cyrez CRA138M 36% | The C. P. Hall Company |
| RX-13804 | Di(2-ethylhexyl) dimerate (Empol 1016) | The C. P. Hall Company |
| Resimene 3520 | methylated melamine, formaldehyde polymer | Solutia |

The following Table V is a summary of the solvent solubilities of a representative adhesive resin, melamine (Resimene 3520) and a representative ester, RX-13804 (di-2-ethylhexyl dimerate) for use in selecting solvents capable of solubilizing both the ester and the resin in making a liquid solution of the adhesion promoter. The solubilities were only determined at 1:1 mixtures of solvent to dimerate/melamine. If both the samples were soluble in the solvent, the solutions were again mixed at a 1:1 ratio of dimerate+solvent to Melamine+solvent. The samples provide complete solubility of both dimerate ester and Melamine resin so long as the composition is at a 13% by weight or greater percent solvent level.

TABLE V

Melamine/Dimerate Solubilities Spot Checks

| Solvent | RX13804 | Melamine | RX13804 + Melamine |
|---|---|---|---|
| Xylene | S | S | S |
| 1,4-Dioxane | S | S | S |
| Toluene | S | S | S |
| Acetonitrile | I | S | I |
| Ethanol | I | S | I |
| n-Hexanol | S | S | S |
| Ethyl Acetate | S | S | S |
| N,N-Dimethylformamide | I | S | I |
| n-Butanol | S | S | S |
| 2-EH (2-ethylhexanol) | S | S | S |

TABLE V-continued

| | | | |
|---|---|---|---|
| Methyl Ethyl Ketone | S | S | S |
| Methyl Isobutyl Ketone | S | S | S |
| Butyl Acetate | S | S | S |
| Chloroform | S | S | S |
| Carbon Tetrachloride | S | S | S |
| Hexane | S | I | I |
| Heptane | S | I | I |
| Isopropanol | S | S | S |
| Isodecyl alcohol | S | S | S |
| Isotridecyl alcohol | S | S | S |
| Ethylene glycol monobutyl ether | S | S | S |
| Dipropylene glycol monobutyl ether | S | S | S |

Melamine/Dimerate Solubilities with 2-EH Quantitative

| Sample | % RX13804 | % Melamine | % 2-EH | Appearance |
|---|---|---|---|---|
| 1 | 42.5 | 42.5 | 15.0 | Clear |
| 2 | 43.0 | 43.0 | 14.0 | Clear |
| 3 | 43.2 | 43.2 | 13.6 | Clear |
| 4 | 43.3 | 43.3 | 13.4 | Clear |
| 5 | 43.5 | 43.5 | 13.0 | Hazy (Insoluble) |

S = Soluble;
I = Insoluble

In order to homogeneously emulsify the ester and/or the resin components of the adhesion promoter in a water-based carrier, any suitable emulsifying/dispersing agents can be used that are capable of forming a stable emulsion. Since the esters have a very low polarity and the resins have a very high polarity, if both the ester and resin are emulsified in a water-based carrier, generally a combination of emulsifying agents is needed to provide a homogeneous, stable emulsion in water. It has been found that the water-based emulsions should have a hydrophile/lipophile balance (HLB) in the range of about 4 to about 5 for best emulsification. Particular combinations of emulsifying agents found to be especially effective in providing a homogeneous, stable water-based emulsion of the dimerate esters and adhesive resin include a combination of an anionic metal stearate, e.g., potassium stearate for the ester, and a non-ionic sorbitan oleate for the adhesive resin, as shown in the following emulsion preparation guide:

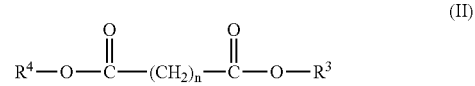

After adding Stearic acid, heat up to 90° C.; add KOH slowly while mixing, mix for 5 minutes, then cool the mixture down to around 50° C. Then add Cyrez, then Span80.

| Composition Component | % by wt. | Chemical | Supplier |
|---|---|---|---|
| Water-Based Emulsion Adhesion Promoter RX-13937 | | | |
| RX-13804 | 49.0 | Di-2-ethylhexyl dimerate | CP Hall |
| Stearic acid | 0.2 | tripled pressed Stearic acid | Witco |
| KOH (45%) | 0.1 | Potassium hydroxide 45% | Ashta |
| Cyrez CRA-138M | 48.7 | methylated melamine, formaldehyde polymer | Cytec |
| Span80 | 2.0 | sorbitan monooleate | Uniqema |
| Solution-Based Adhesion Promoter RX-13928 | | | |
| ester | 42.5 | Di-2-ethylhexyl dimerate | CP Hall |
| resin | 42.5 | methylated melamine formaldehyde resin | UCB |
| solvent | 15.0 | 2-ethylhexanol | Sunoco |

What is claimed is:

1. A sealant composition comprising a sealant; and an adhesion promoter containing (1) an adhesive resin in an amount of about 0.1% to about 15% by weight, based on the weight of the sealant in the sealant composition; and (2) an ester having formula II, III, IV or a combination of any two or more of said esters in an amount of about 0.1% to about 15% by weight, based on the weight of the sealant in the sealant composition:

$$R^4-O-\overset{O}{\underset{\|}{C}}-(CH_2)_n-\overset{O}{\underset{\|}{C}}-O-R^3 \quad (II)$$

wherein n=3–24, and $R^3$ and $R^4$, same or different, are a $C_6-C_{24}$ alkyl radical, straight chain or branched, saturated or unsaturated containing 1 to 3 carbon-to-carbon double bonds;

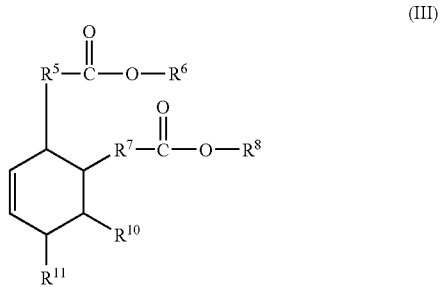

wherein $R^5$ and $R^7$, same or different, are a $C_3-C_{24}$ hydrocarbon chain, straight chain or branched, either saturated or having 1 to 6 carbon-to-carbon double bonds;

$R^6$ and $R^8$, same or different, are $C_3-C_{24}$ alkyl radical, straight chain or branched, saturated or unsaturated containing 1 to 3 carbon-to-carbon double bonds; and $R^{10}$ and $R^{11}$, same or different, are a $C_3-C_{24}$, saturated hydrocarbon chain, straight chain or branched; or an unsaturated $C_3-C_{24}$, hydrocarbon chain, straight chain or branched, having 1 to 6, carbon-to-carbon double bonds;

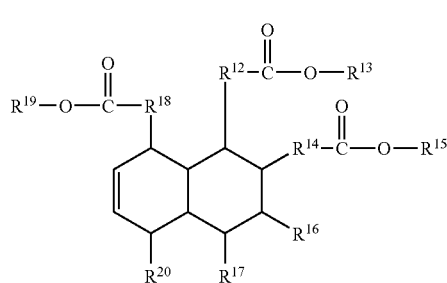
(IV)

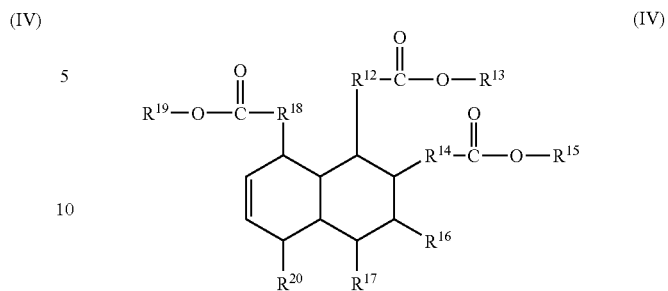
(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

2. The sealant composition of claim 1, wherein the ester is selected from the group consisting of formula II, III, IV, and a combination of any two or more of said esters:

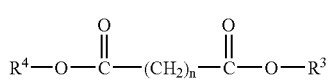
(II)

wherein n=6–18, and $R^3$ and $R^4$, same or different, are a $C_6$–$C_{18}$ alkyl radical, straight chain or branched, saturated or unsaturated containing 1 to 3 carbon-to-carbon double bonds;

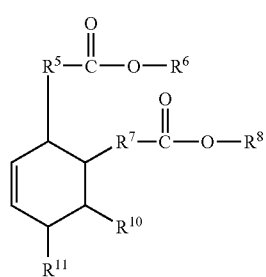
(III)

wherein $R^5$ and $R^7$, are a $C_6$–$C_{24}$ hydrocarbon chain, straight chain or branched; either saturated or having 1 to 3 carbon-to-carbon double bonds;

$R^6$ and $R^8$, same or different, are a $C_3$–$C_{18}$ alkyl radical, straight chain or branched, saturated or unsaturated containing 1 to 3 carbon-to-carbon double bonds; and $R^{10}$ and $R^{11}$, same or different, are a $C_3$–$C_{18}$, saturated hydrocarbon chain, straight chain or branched; or an unsaturated hydrocarbon chain, straight chain or branched, containing 1 to 3 carbon-to-carbon double bonds;

wherein $R^{12}$, $R^{14}$ and $R^{18}$, same or different, are a $C_8$–$C_{18}$, hydrocarbon chain, straight chain or branched, either saturated or having 1 to 3 carbon-to-carbon double bonds;

$R^{13}$, $R^{15}$ and $R^{19}$, same or different, are a $C_6$–$C_{18}$ alkyl radical, straight chain or branched, saturated or unsaturated containing 1 to 3 carbon-to-carbon double bonds; and $R^{16}$, $R^{17}$ and $R^{20}$, same or different, are a $C_6$–$C_{18}$ saturated hydrocarbon chain, straight chain or branched; or an unsaturated $C_6$–$C_{18}$ hydrocarbon chain, straight chain or branched, containing 1 to 3 carbon-to-carbon double bonds.

3. The sealant composition of claim 1, wherein the adhesive resin is a condensation product of a methylene acceptor and a methylene donor.

4. The sealant composition of claim 3, wherein the adhesive resin is selected from the group consisting of phenol-formaldehyde, melamine-formaldehyde; naphthol-formaldehyde; polyepoxide; a reaction product of triallyl cyanurate, resorcinol, and formaldehyde; a reaction product of p-chlorophenol, resorcinol, and formaldehyde; a copolymer of styrene, butadiene, and 2-vinylpyridine; and mixtures thereof.

5. The sealant composition of claim 4, wherein the phenol-formaldehyde resin is resorcinol-formaldehyde.

6. The sealant composition of claim 1, wherein the adhesive resin is selected from the group consisting of melamine, acetoguanamine, benzoguanamine, cyclohexylguanamine and glycoluril monomers and oligomers of these monomers, which have been substituted at two or more positions on the monomer or on each unit of the oligomer with vinyl terminated radicals, the sealant composition being free of resorcinol.

7. The sealant composition of claim 6, wherein at least one of the adhesive resins has been further substituted at one or more positions with a radical which comprises carbamoylmethyl or amidomethyl.

8. The sealant composition of claim 6, wherein the adhesive resin is selected from compounds of the formula:

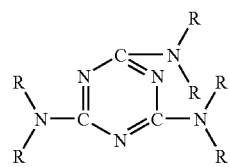

-continued

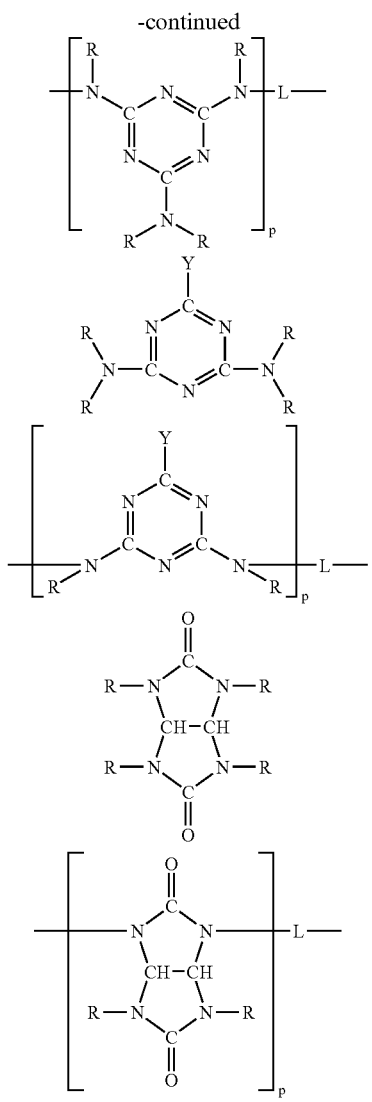

and positional isomers thereof,
  wherein, in each monomer and in each polymerized unit of the oligomers, Y is selected from methyl, phenyl and cyclohexyl, and at least two R are —CH$_2$—R$^1$, and any remaining R are H, and at least 2 R$^1$ are radicals selected from

CH$_2$=C(R$^2$)—C(O)—O—,

CH$_2$=C(R$^2$)—C(O)-Z,

CH$_2$=C(R$^2$)—C(O)—NH—, and

CH$_2$=C(R$^2$)—CH$_2$—O—, wherein R$^2$ is hydrogen or C$_1$–C$_{18}$ alkyl, and Z is a radical selected from

—O—CH$_2$—CH$_2$—O—,

—O—CH$_2$—CH(CH$_3$)—O—,

—O—CH$_2$—CH$_2$—CH$_2$O—, and

—O—CH(C$_2$H$_5$)—O—, and any remaining R$^1$ radicals are selected from

—O—R$^3$,

—NH—C(O)—OR$^4$, and

—NH—C(O)—R$^4$, and wherein R$_3$ is hydrogen or R$_4$, and R$_4$ is a C$_1$–C$_{18}$ alkyl, alicyclic, hydroxyalkyl, alkoxyalkyl or aromatic radical, and in the oligomers, P is 2 to about 10, and L is methylene or the radical

—CH$_2$—O—CH$_2$—.

9. The sealant composition of claim 8, wherein at least one R$^1$ in each monomer or in each oligomerized unit of the adhesive resin is:

—NH—C(O)—OR$^4$ wherein R$^4$ is as defined in claim 8.

10. The sealant composition of claim 9, wherein the adhesive resin is a compound of the formula

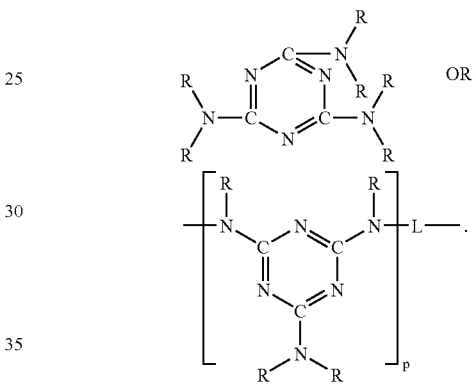

11. The sealant composition of claim 10, wherein in the adhesive resin formulas, at least one R radical in each monomer or in each oligomerized unit is

—CH$_2$NH—C(O)—OR$^4$ wherein R$^4$ is a C$_1$–C$_{18}$ alkyl, alicyclic, hydroxyalkyl, alkoxyalkyl or aromatic radical.

12. The sealant composition of claim 10, wherein at least two R radicals are selected from

CH$_2$=C(CH$_3$)—C(O)O—C$_3$H$_6$—O—CH$_2$ and

CH$_2$=CH$_2$—C(O)O—C$_2$H$_4$—O—CH$_2$— and at least one R radical is selected from

CH$_2$—NH—C(O)—O—CH$_3$ and

—CH$_2$—NH—C(O)—O—C$_3$H$_7$.

13. The sealant composition of claim 8, further comprising an additional additive selected from hydroxymethylated and alkoxymethylated derivatives of melamine, acetoguanamine, benzoguanamine, cyclohexylguanamine and glycoluril and their oligomers.

14. The sealant composition of claim 6, wherein the adhesive resin is a melamine or an oligomer of melamine.

15. The sealant composition of claim 6, wherein the adhesive resin is a acetoguanamine or an oligomer of acetoguanamine.

16. The sealant composition of claim 6, wherein the adhesive resin is a benzoguanamine or an oligomer of benzoguanamine.

17. The sealant composition of claim 6, wherein the adhesive resin is a cyclohexylguanamine or an oligomer of cyclohexylguanamine.

18. The sealant composition of claim 1, wherein the adhesive resin is a self-condensing alkylated triazine resin selected from the group consisting of (i), (ii), and (iii):
(i) a self-condensing alkylated triazine resin having at least one of imino or methylol functionality and represented by formula (V)

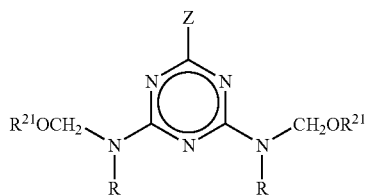

(ii) an oligomer of (i), or
(iii) a mixture of (i) and (ii), wherein
Z is —N(R)(CH$_2$OR$^{21}$), aryl having 6 to 10 carbon atoms, alkyl having 1 to 20 carbon atoms or an acetyl group,
each R is independently hydrogen or CH$_2$OR$^{21}$, and
each R$^{21}$ is independently hydrogen or an alkyl group having 1 to 12 carbon atoms,
provided that at least one R is hydrogen or —CH$_2$OH and at least one R$^{21}$ is selected from the alkyl group; and
wherein the sealant composition is substantially free of methylene acceptor coreactants.

19. The sealant composition of claim 18, wherein at least one R group is hydrogen.

20. The sealant composition of claim 19, wherein at least one R$^{21}$ group is a lower alkyl group having 1 to 6 carbon atoms.

21. The sealant composition of claim 20, wherein the adhesive resin is a melamine, benzoguanamine, cyclohexylguanamine, or acetoguanamine, or an oligomer thereof.

22. The sealant composition of claim 20, wherein Z is —N(R)(CH$_2$OR$^{21}$).

23. The sealant composition of claim 4, wherein the phenol-formaldehyde resin is resorcinol-formaldehyde; and the melamine-formaldehyde resin is N-(substituted oxymethyl) melamine-formaldehyde.

24. The sealant composition of claim 1, wherein the ester has the formula II and comprises a saturated diester formed by the reaction of sebacic acid and a C$_6$–C$_{24}$ alcohol, straight chain or branched, saturated or unsaturated containing 1 to 3 carbon-to-carbon double bonds.

25. The sealant composition of claim 24, wherein the alcohol is 2-ethylhexyl alcohol, and the ester has the following formula:

26. The sealant composition of claim 1, wherein the ester is an unsaturated diester formed by the reaction of a C$_{36}$ dimer acid and a C$_3$–C$_{24}$ alcohol, straight chain or branched, saturated or unsaturated containing 1 to 3 carbon-to-carbon double bonds.

27. The sealant composition of claim 26, wherein the alcohol is 2-ethylhexyl alcohol.

28. The sealant composition of claim 26, wherein the alcohol is tridecyl alcohol.

29. The sealant composition of claim 26, wherein the alcohol is oleyl alcohol.

30. The sealant composition of claim 1, wherein the ester comprises the following dimer acid reacted with a C$_3$–C$_{24}$ alcohol:

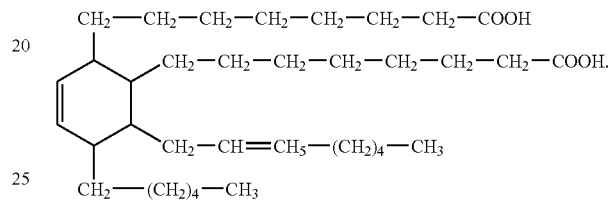

31. The sealant composition of claim 1, wherein the ester comprises the following dimer acid reacted with a C$_3$–C$_{24}$ alcohol:

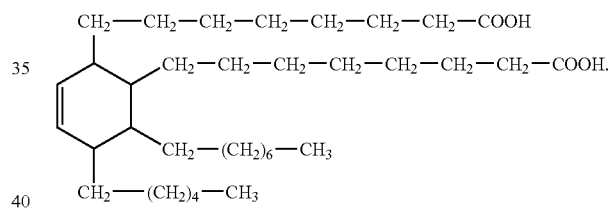

32. The sealant composition of claim 1, wherein the ester comprises the following dimer acid reacted with a C$_3$–C$_{24}$ alcohol:

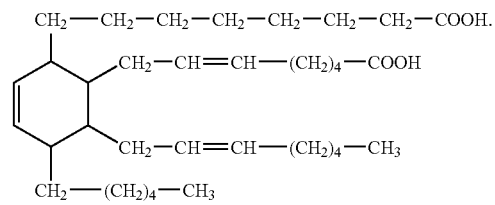

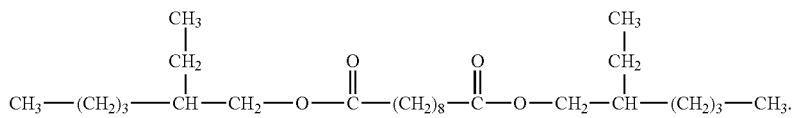

33. The sealant composition of claim 1, wherein the ester is the reaction product of a $C_3$–$C_{24}$ alcohol with a tricarboxylic acid having the following formula:

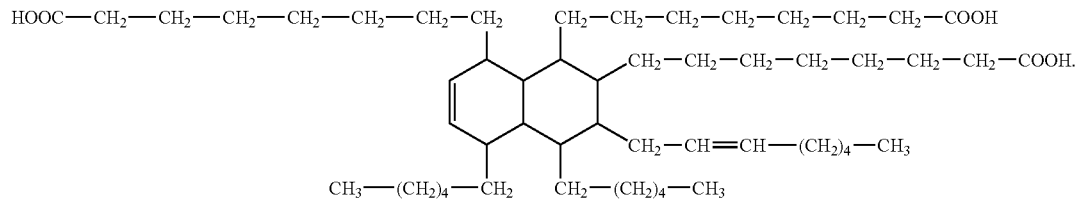

34. The sealant composition of claim 1, wherein the ester is a combination of compounds of formula II, III, IV.

35. The sealant composition of claim 34, wherein the ester is a reaction product of a $C_3$–$C_{24}$ alcohol straight chain or branched, saturated or unsaturated having 1 to 3 carbon-to-carbon double bonds, with a dimer acid having CAS #61788-89-4.

36. The sealant composition of claim 35, wherein the alcohol is 2-ethylhexyl alcohol.

37. The sealant composition of claim 35, wherein the alcohol is a tridecyl alcohol.

38. The sealant composition of claim 35, wherein the alcohol is an oleyl alcohol.

39. The sealant composition of claim 1, wherein the ester is a combination of compounds having formula III, and IV.

40. The sealant composition of claim 1, wherein the ester has formula III.

41. The sealant composition of claim 1, wherein the ester has formula IV.

42. The sealant composition of claim 1, wherein the adhesion promoter is a liquid selected from the group consisting of a solvent solution and a water-based emulsion.

43. The sealant composition of claim 42, wherein the adhesion promoter is a solvent solution comprising 2-ethylhexyl alcohol.

44. The sealant composition of claim 1, wherein the adhesion promoter is mixed with a solid, inert carrier.

45. The sealant composition of claim 44, wherein the solid, inert carrier is calcium silicate.

46. The sealant composition of claim 1, further comprising a reactive diluent in an amount of about 0.5% to about 50% by weight, based on the total weight of the adhesion promoter.

47. The sealant composition of claim 46, wherein the reactive diluent is a monomer selected from the group consisting of (1) a glycidyl ether; (2) a diglycidyl ether; (3) an aliphatic, straight chain epoxide; (4) an epoxidized vegetable oil; (5) a cycloaliphatic epoxy; (6) a glycidyl ester; (7) a diglycidyl ester; and any combination thereof.

48. The sealant composition of claim 1, wherein the sealant comprises a polymer having a molecular weight between about 5000 grams/mol and about 100,000 grams/mol, and a curing agent for the polymer.

49. The sealant composition of claim 48, wherein the sealant is selected from the group consisting of synthetic polymers and natural polymers.

50. The sealant composition of claim 49, wherein the polymer is a synthetic sealant polymer selected from the group consisting of silicones, butyl rubbers, acrylics, urethanes, and modified urethanes.

51. The sealant composition of claim 1, wherein the $R^5$, $R^7$, $R^{12}$, $R^{14}$ are fatty acid residues derived from animal or vegetable fatty acids.

52. The sealant composition of claim 51, wherein the fatty acids are selected from the group consisting of butter; lard; tallow; grease; herring; menhaden; pilchard; sardine; babassu; castor; coconut; corn; cottonseed; jojoba; linseed; oiticia; olive; palm; palm kernel; peanut; rapeseed; safflower; soya; sunflower; tall; tung; and mixtures thereof.

53. The sealant composition of claim 52, wherein the fatty acid residues are selected from the group consisting of hexanoic; octanoic; decanoic; dodecanoic; 9-dodecenoic; tetradecanoic; 9-tetradecenoic; hexadecanoic; 9-hexadecenoic; octadecanoic; 9-octadecenoic; 9-octadecenoic, 12-hydroxy; 9,12-octadecadienoic; 9,12,15-octadecatrienoic; 9,11,13-octadecatrienoic; 9,11,13-octadecatrienoic, 4-oxo; octadecatetrenoic; eicosanoic; 11-eieosenoic; eicosadienoic; eicosatrienoic; 5,8,11,14-ejcosatetraenoic; eicosapentaenoic; docosanoic; 13-docosenoic; docosatetraenoic; 4,8,12,15,19-docosapentaenoic; docosahexaenoic; tetracosenoic; and 4,8,12,15,18,21-tetracosahexaenoic.

54. A method of increasing the adhesion of a sealant composition to a ceramic, glass, metal, polymeric, cementitious, or asphaltic substrate, said sealant composition comprising a sealant and an adhesive resin, the method comprising mixing with said sealant composition, in an amount of about 0.1% to 15% by weight, based on the weight of the sealant in the sealant composition, an ester having formula II, III, IV, or mixtures thereof:

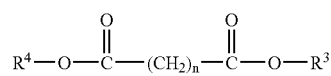

wherein n=3–24 and $R^3$ and $R^4$, same or different, are a $C_6$–$C_{24}$ alkyl radical, straight chain or branched;

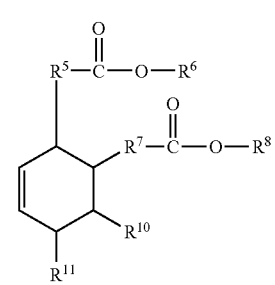

wherein $R^5$ and $R^7$, same or different, are a $C_3$–$C_{24}$ hydro carbon chain, straight chain or branched, either saturated or having 1 to 6 carbon-to-carbon double bonds;

R and R⁸, same or different, are a $C_3$–$C_{24}$ alkyl radical, straight chain or branched; and R¹⁰ and R¹¹, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

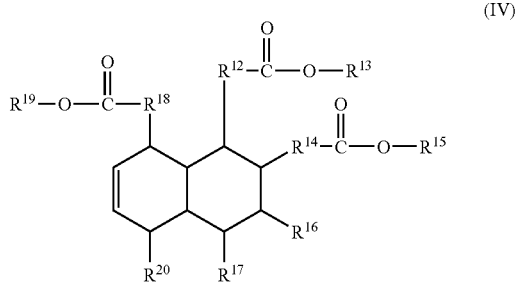

(IV)

wherein R¹², R¹⁴ and R¹⁸, same or different, are a $C_3$–$C_{24}$ hydrocarbon chain, straight chain or branched, either saturated or having 1 to 6 carbon-to-carbon double bonds;

R¹³, R¹⁵ and R¹⁹, same or different, are $C_3$–$C_{24}$ alkyl radical, straight chain or branched, saturated or unsaturated containing 1 to 3 carbon-to-carbon double bonds; and R¹⁶, R¹⁷ and R²⁰, same or different, are $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

55. The method of claim 54, wherein the substrate is a ceramic substrate.

56. The method of claim 54, wherein the substrate is a glass substrate.

57. The method of claim 54, wherein the substrate is a metal flat stock material.

58. The method of claim 54, wherein the substrate is a polymeric substrate.

59. The method of claim 54, wherein the substrate is a cementitious substrate.

60. The method of claim 59, wherein the substrate is a concrete substrate.

61. The method of claim 54, wherein the substrate is an asphaltic substrate.

62. The method of claim 54, wherein the mixing comprises adding a liquid comprising the adhesive resin and the ester having Formula III, IV, or mixtures thereof, and the liquid is selected from the group consisting of a solvent solution and a water-based emulsion.

63. The method of claim 62, wherein the liquid is a solvent solution comprising 2-ethylhexyl alcohol.

64. The method of claim 62, wherein the liquid is a solvent solution further comprising a reactive diluent in an amount of about 0.5% to about 50% by weight, based on the total weight of the adhesive resin and the ester having Formula III, IV, or mixtures thereof.

65. The method of claim 64, wherein the reactive diluent is a monomer selected from the group consisting of (1) a glycidyl ether; (2) a diglycidyl ether; (3) an aliphatic, straight chain epoxide; (4) an epoxidized vegetable oil; (5) a cycloaliphatic epoxy; (6) a glycidyl ester; (7) a diglycidyl ester; and any combination thereof.

66. The method of claim 54, wherein the adding comprises adding a mixture of the adhesive resin and the ester having Formula II, III, IV, or mixtures thereof, and a solid, inert carrier.

67. The method of claim 66, further comprising heating the mixture to a temperature between about 50° C. and about 200° C. before adding the mixture.

68. The method of claim 54, wherein the adding comprises coating the substrate with a solution comprising the ester having Formula II, III, IV, or mixtures thereof.

69. A method of adhering a sealant composition to a ceramic, glass, metal, polymeric, cementitious, or asphaltic substrate, said sealant composition comprising a sealant and a combination of esters having formula I, III, and IV, the method comprising coating the substrate with a liquid containing an adhesive resin to form a coated substrate; and applying the sealant composition to the coated substrate:

(I)

wherein R¹ is a $C_3$–$C_{24}$ alkyl radical, straight chain or branched, saturated or unsaturated containing 1 to 3 carbon-to-carbon double bonds; R² is a $C_3$–$C_{24}$ saturated fatty acid residue, or an unsaturated fatty acid residue having 1 to 6 carbon-to-carbon double bonds;

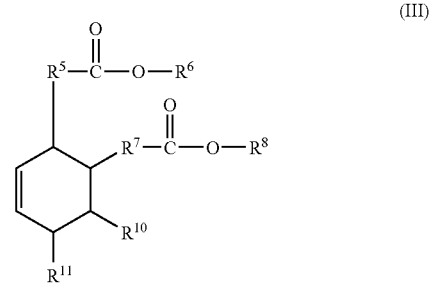

(III)

wherein R⁵ and R⁷, same or different, are a $C_3$–$C_{24}$ hydrocarbon chain, straight chain or branched, either saturated or having 1 to 6 carbon-to-carbon double bonds;

R⁶ and R⁸, same or different, are a $C_3$–$C_{24}$ alkyl radical, straight chain or branched; and R¹⁰ and R¹¹, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

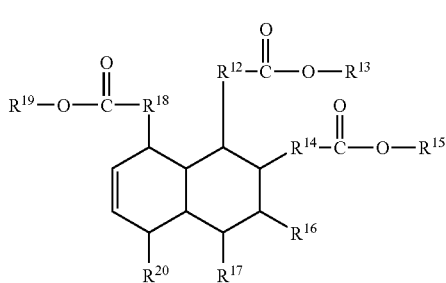

(IV)

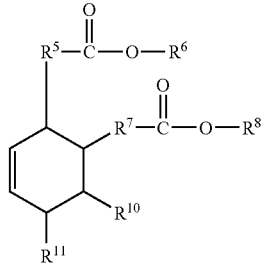

(III)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are $C_3$–$C_{24}$ alkyl radical, straight chain or branched, saturated or unsaturated containing 1 to 3 carbon-to-carbon double bonds; and $R^{16}$, $R^{17}$ and $R^{20}$, same or different, are $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

70. The method of claim 69, wherein the substrate is a ceramic substrate.

71. The method of claim 69, wherein the substrate is a glass substrate.

72. The method of claim 69, wherein the substrate is a metal flat stock material.

73. The method of claim 69, wherein the substrate is a polymeric substrate.

74. The method of claim 69, wherein the substrate is a cementitious substrate.

75. The method of claim 74, wherein the substrate is a concrete substrate.

76. The method of claim 69, wherein the substrate is an asphaltic substrate.

77. A sealant composition comprising a sealant; and a combination of esters having formula I, III, and IV in an amount of about 0.1% to about 15% by weight, based on the weight of the sealant in the sealant composition:

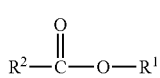

(I)

wherein $R^1$ is a $C_3$–$C_{24}$ alkyl radical, straight chain or branched, saturated or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are $C_3$–$C_{24}$ alkyl radical, straight chain or branched, saturated or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds;

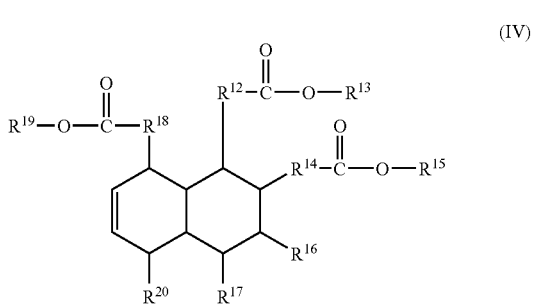

(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl, straight chain or branched, saturated or unsaturated containing 1 to 3 carbon-to-carbon double bonds; and $R^{16}$, $R^{17}$ and $R^{20}$ same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

78. The sealant composition of claim 77, further comprising an adhesive resin.

79. The sealant composition of claim 78, wherein the adhesive resin is a condensation product of a methylene acceptor and a methylene donor.

80. The sealant composition of claim 79, wherein the adhesive resin is selected from the group consisting of phenol-formaldehyde, melamine-formaldehyde; naphthol-formaldehyde; polyepoxide; a reaction product of triallyl cyanurate, resorcinol, and formaldehyde; a reaction product of p-chlorophenol, resorcinol, and formaldehyde; a copolymer of styrene, butadiene, and 2-vinylpyridine; and mixtures thereof.

81. The sealant composition of claim 1, wherein the ester is a reaction product of a $C_3$–$C_{24}$ alcohol straight chain or branched, saturated or unsaturated having 1 to 3 carbon-to-carbon double bonds, with a dimer acid having GAS #61788-89-4.

82. The sealant composition of claim 81, wherein the alcohol is 2-ethylhexyl alcohol.

83. The sealant composition of claim 81, wherein the alcohol is a tridecyl alcohol.

84. A sealant composition 81, wherein the alcohol is an oleyl alcohol.

85. A sealant composition comprising a sealant and a combination of ester compounds having formula III, and IV

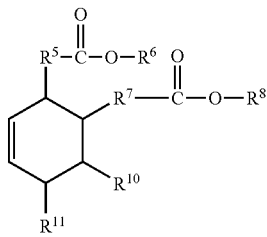

(III)

wherein $R^5$ and $R^7$. same or different, are a $C_3$–$C_{24}$ hydrocarbon chain. straight chain or branched, either saturated or having 1 to 6 carbon-to-carbon double bonds:

$R^6$ and $R^8$, same or different, are $C_3$–$C_{24}$ alkyl radical, straight chain or branched, saturated or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds;

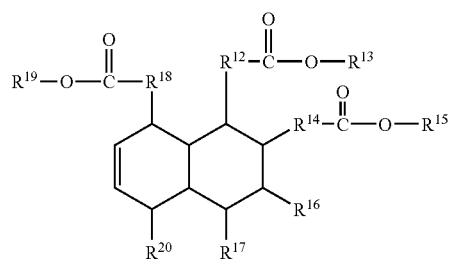

(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are a $C_3$–$C_{24}$ alkyl. straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3C_{24}$ hydrocarbon chain, straight chain or branched. containing 1 to 6 carbon-to-carbon double bonds.

86. A sealant composition comprising a sealant and an ester having formula III

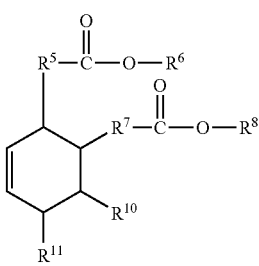

(III)

wherein $R^5$ and $R^7$, same or different, are a $C_3$–$C_{24}$ hydrocarbon chain, straight chain or branched, either saturated or having 1 to 6 carbon-to-carbon double bonds;

$R^6$ and $R^8$, same or different, are $C_3$–$C_{24}$ alkyl radical, straight chain or branched, saturated or unsaturated containing 1 to 3 carbon-to-carbon double bonds; and $R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6, carbon-to-carbon double bonds.

87. A sealant composition comprising a sealant and an ester of formula IV

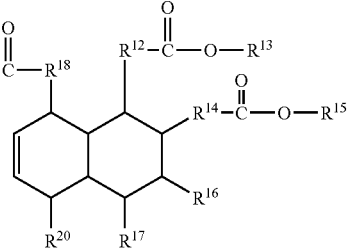

(IV)

wherein $R^{12}$, $R^{14}$ and $R^{18}$ same or different. are a $C_3$–$C_{24}$ hydrocarbon chain, straight chain or branched, either saturated or having 1 to 6 carbon-to-carbon double bonds; $R^{13}$, $R^{15}$ and $R^{19}$, same or different, are a $C_3$–$C_{24}$ alkyl, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

88. A method of adhering a sealant composition to a cementitious, substrate, said sealant composition comprising a sealant and an ester having formula I, II, III, IV, or mixtures thereof, the method comprising coating the substrate with a liquid containing an adhesive resin to form a coated substrate; and applying the sealant composition to the coated substrate:

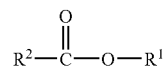

(I)

wherein $R^1$ is a $C_3$–$C_{24}$ ailcyl radical, straight chain or branched, saturated or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

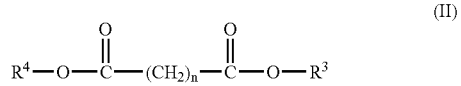
(II)

wherein n=3–24 and $R^3$ and $R^4$, same or different, are a $C_3$–$C_{24}$ alkyl radical, straight chain or branched;

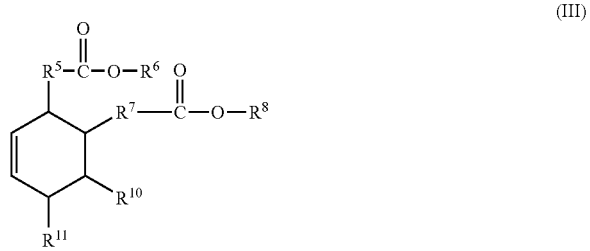
(III)

wherein $R^5$ and $R^7$, same or different, are a $C_3$–$C_{24}$ hydro carbon chain, straight chain or branched, either saturated or having 1 to 6 carbon-to-carbon double bonds;
$R^6$ and $R^8$, same or different, are a $C_3$–$C_{24}$ alkyl radical, straight chain or branched; and
$R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

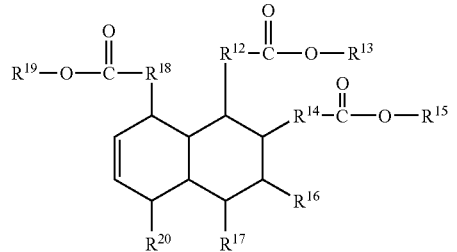
(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;
$R^{13}$, $R^{15}$ and $R^{19}$, same or different, are $C_3$–$C_{24}$ alkyl radical, straight chain or branched, saturated or unsaturated containing 1 to 3 carbon-to-carbon double bonds; and
$R^{16}$ $R^{17}$ and $R^{20}$ same or different, are $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

89. A method of adhering a sealant composition to a concrete substrate, said sealant composition comprising a sealant and an ester having formula I, II, III, IV, or mixtures thereof, the method comprising coating the substrate with a liquid containing an adhesive resin to form a coated substrate; and applying the sealant composition to the coated substrate:

(I)

wherein $R^1$ is a $C_3$–$C_{24}$ alkyl radical, straight chain or branched, saturated or unsaturated containing 1 to 3 carbon-to-carbon double bonds; $R^2$ is a $C_3$–$C_{24}$ saturated fatty acid residue, or an unsaturated fatty acid residue having 1 to 6 carbon-to-carbon double bonds;

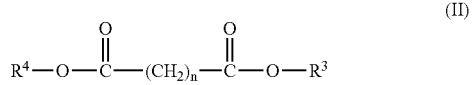
(II)

wherein n=3–24 and $R^3$ and $R^4$, same or different, are a $C_3$–$C_{24}$ alkyl radical, straight chain or branched;

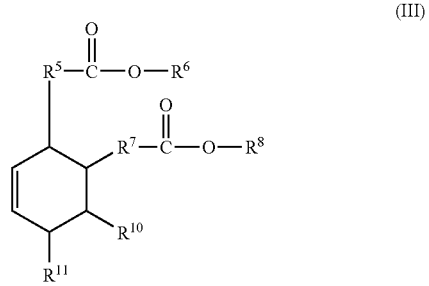
(III)

wherein $R^5$ and $R^7$, same or different, are a $C_3$–$C_{24}$ hydro carbon chain, straight chain or branched, either saturated or having 1 to 6 carbon-to-carbon double bonds;
$R^6$ and $R^8$, same or different, are a $C_3$–$C_{24}$ ailcyl radical, straight chain or branched; and
$R^{10}$ and $R^{11}$, same or different, are a $C_3$–$C_{24}$, saturated hydrocarbon chain, straight chain or branched; or an unsaturated $C_3$–$C_{24}$, hydrocarbon chain, straight chain or branched, having 1 to 6 carbon-to-carbon double bonds;

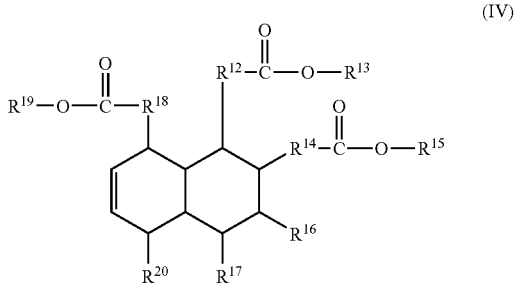
(IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds;

$R^{13}$, $R^{15}$ and $R^{19}$, same or different, are $C_3-C_{24}$ alkyl radical, straight chain or branched, saturated or unsaturated containing 1 to 3 carbon-to-carbon double bonds; and $R^{16}$ $R^{17}$ and $R^{20}$, same or different, are $C_3-C_{24}$ saturated hydrocarbon chain, straight chain or branched; or unsaturated $C_3-C_{24}$ hydrocarbon chain, straight chain or branched, containing 1 to 6 carbon-to-carbon double bonds.

90. A method of adhering a sealant composition to an asphaltic substrate, said sealant composition comprising a sealant and an ester having formula I, II, III, IV, or mixtures thereof, the method comprising coating the substrate with a liquid containing an adhesive resin to form a coated substrate; and applying the sealant composition to the coated substrate:

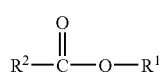
(I)

wherein $R^1$ is a $C_3-C_{24}$ alkyl radical, straight chain or branched, saturated or unsaturated containing 1 to 3 carbon-to-carbon double bonds; $R^2$ is a $C_3-C_{24}$ saturated fatty acid residue, or an unsaturated fatty acid residue having 1 to 6 carbon-to-carbon double bonds;

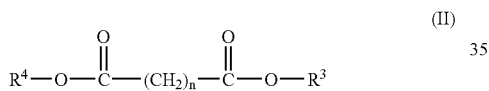
(II)

wherein n=3–24 and $R^3$ and $R^4$, same or different, are a $C_3-C_{24}$ alkyl radical, straight chain or branched;

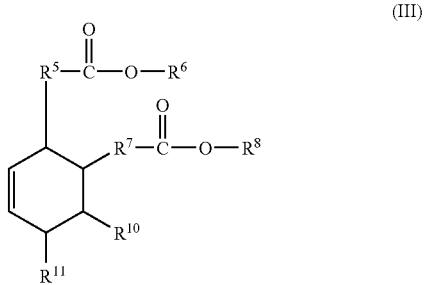
(III)

wherein $R^5$ and $R^7$, same or different, are a $C_3-C_{24}$ hydrocarbon chain, straight chain or branched, either saturated or having 1 to 6 carbon-to-carbon double bonds;

$R^6$ and $R^8$, same or different, are a $C_3-C_{24}$ alkyl radical, straight chain or branched; and $R^{10}$ and $R^{11}$, same or different, are a $C_3-C_{24}$, saturated hydrocarbon chain, straight chain or branched; or an unsaturated $C_3-C_{24}$, hydrocarbon chain, straight chain or branched, having 1 to 6 carbon-to-carbon double bonds;

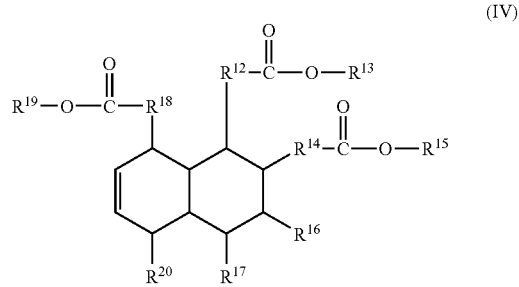
(IV)

wherein $R^{12}$, $R^{14}$ and $R^{18}$, same or different, are a $C_3-C_{24}$ hydrocarbon chain, straight chain or branched, either saturated or having 1 to 6 carbon-to-carbon double bonds;

$R^{13}$,$R^{15}$ and $R^{19}$, same or different, are $C_3-C_{24}$ alkyl radical, straight chain or branched, saturated or unsaturated containing 1 to 3 carbon-to-carbon double bonds; and $R^{16}$, $R^{17}$ and $R^{20}$, same or different, are $C_3-C_{24}$ saturated hydrocarbon chain, straight chain or branched; or unsaturated $C_3-C_{24}$ hydrocarbon chain, straight chain or branched, containing 1 to 6 carbon-to-carbon double bonds.

91. A sealant composition comprising a sealant; and a combination of esters having formula II, III, and IV in an amount of about 0.1% to about 15% by weight, based on the weight of the sealant in the sealant composition:

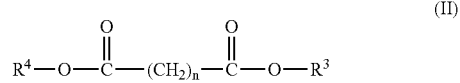
(II)

wherein n=3–24, and $R^3$ and $R^4$, same or different, are a $C_3-C_{24}$ alkyl radical, straight chain or branched, saturated or unsaturated containing 1 to 3 carbon-to-carbon double bonds;

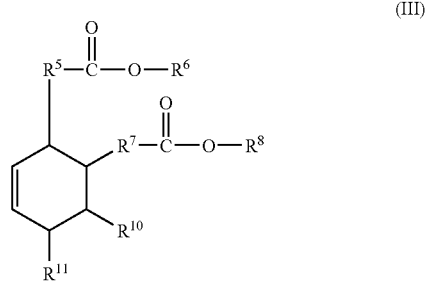
(III)

wherein $R^5$ and $R^7$, same or different, are a $C_3-C_{24}$ hydrocarbon chain, straight chain or branched, either saturated or having 1 to 6 carbon-to-carbon double bonds;

$R^6$ and $R^8$, same or different, are $C_3-C_{24}$ alkyl radical, straight chain or branched, saturated or unsaturated containing 1 to 3 carbon-to-carbon double bonds; and $R^{10}$ and $R^{11}$, same or different, are a $C_3-C_{24}$, saturated hydrocarbon chain, straight chain or branched; or an unsaturated $C_3-C_{24}$, hydrocarbon chain, straight chain or branched, having 1 to 6, carbon-to-carbon double bonds;

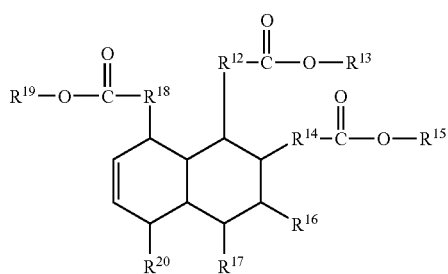 (IV)

wherein $R^{12}$, $R^{14}$ and $R^{18}$, same or different, are a $C_3$–$C_{24}$ hydrocarbon chain, straight chain or branched, either saturated or having 1 to 6 carbon-to-carbon double bonds; $R^{13}$, $R^{15}$ and $R^{19}$, same or different, are a $C_3$–$C_{24}$ alkyl, straight chain or branched, saturated or unsaturated containing 1 to 3 carbon-to-carbon double bonds; and $R^{16}$, $R^{17}$ and $R^{20}$, same or different, are a $C_3$–$C_{24}$ saturated hydrocarbon chain, straight chain or branched; or unsaturated $C_3$–$C_{24}$ hydrocarbon chain, straight chain or branched, containing 1 to 6 carbon-to-carbon double bonds.

92. The sealant composition of claim 91, further comprising an adhesive resin.

\* \* \* \* \*

UNITED STATES PATENT AND TRADEMARK OFFICE
CERTIFICATE OF CORRECTION

| | |
|---|---|
| PATENT NO. | : 7,144,937 B2 |
| APPLICATION NO. | : 10/718233 |
| DATED | : December 5, 2006 |
| INVENTOR(S) | : Jerome M. Klosowski et al. |

It is certified that error appears in the above-identified patent and that said Letters Patent is hereby corrected as shown below:

<u>In the Drawings:</u>

Delete all Figures; None were submitted with application or any amendments.

At Column 26, line 63, "$C_3$-$C_{24}$," should be -- $C_3$-$C_{24}$ --.

At Column 26, line 65, "$C_3$-$C_{24}$," should be -- $C_3$-$C_{24}$ --.

At Column 26, line 66, "6, carbon-to-carbon" should be -- 6 carbon-to-carbon --.

At Column 27, line 63, "$C_3$-$C_{18}$," should be -- $C_3$-$C_{18}$ --.

At Column 28, line 15, "$C_8$-$C_{18}$, hydrocarbon" should be -- $C_8$-$C_{18}$ hydrocarbon --.

At Column 30, line 42, "-$CH_2NH$-$C(O)$-$OR^4$" should be -- -$CH_2$-$NH$-$C(O)$-$OR^4$ --.

At Column 34, line 29, "11-eieosenoic" should be -- 11-eicosenoic --.

At Column 34, line 30, "14-ejcosatetraenoic" should be -- 14-eicosatetraenoic --.

At Column 35, line 1, "$R$ and $R^8$" should be -- $R^6$ and $R^8$ --.

At Column 35, line 3, "$C_3$-$C_{24}$," should be -- $C_3$-$C_{24}$ --.

At Column 35, line 5, "$C_3$-$C_{24}$," should be -- $C_3$-$C_{24}$ --.

At Column 36, line 63, "$C_3$-$C_{24}$," should be -- $C_3$-$C_{24}$ --.

At Column 36, line 65, "$C_3$-$C_{24}$," should be -- $C_3$-$C_{24}$ --.

At Column 37, line 15, "$C_3C_{24}$," should be -- $C_3$-$C_{24}$ --.

At Column 38, line 21, "$C_3$-$C_{24}$," should be -- $C_3$-$C_{24}$ --.

At Column 38, line 23, "$C_3$-$C_{24}$," should be -- $C_3$-$C_{24}$ --.

At Column 38, line 24, "6, carbon-to-carbon" should be -- 6 carbon-to-carbon --.

At Column 38, line 52, "$R^{20}$ same" should be -- $R^{20}$, same --.

UNITED STATES PATENT AND TRADEMARK OFFICE
CERTIFICATE OF CORRECTION

PATENT NO.         : 7,144,937 B2
APPLICATION NO.    : 10/718233
DATED              : December 5, 2006
INVENTOR(S)        : Jerome M. Klosowski et al.

It is certified that error appears in the above-identified patent and that said Letters Patent is hereby corrected as shown below:

At Column 39, line 7, "GAS" should be -- CAS --.

At Column 39, line 31, "$R^7$." should be -- $R^7$, --.

At Column 39, line 32, "chain." should be -- chain, --.

At Column 39, line 33, "bonds:" should be -- bonds; --.

At Column 39, line 37, "$C_3$-$C_{24}$," should be -- $C_3$-$C_{24}$ --.

At Column 39, line 39, "$C_3$-$C_{24}$," should be -- $C_3$-$C_{24}$ --.

At Column 39, line 40, "6, carbon-to-carbon" should be -- 6 carbon-to-carbon --.

At Column 39, line 60, "alkyl." should be -- alkyl, --.

At Column 39, line 65, "$C_3C_{24}$" should be -- $C_3$-$C_{24}$ --.

At Column 39, line 66, "branched." should be -- branched, --.

At Column 40, line 23, "$C_3$-$C_{24}$," should be -- $C_3$-$C_{24}$ --.

At Column 40, line 25, "$C_3$-$C_{24}$," should be -- $C_3$-$C_{24}$ --.

At Column 40, line 26, "6, carbon-to-carbon" should be -- 6 carbon-to-carbon --.

At Column 40, line 43, "$R^{18}$" should be -- $R^{18}$, --.

At Column 40, line 43, "different." should be -- different, --.

At Column 40, line 55, "cementitious," should be -- cementitious --.

At Column 41, line 1, "ailcyl" should be -- alkyl --.

At Column 41, line 33, "$C_3$-$C_{24}$," should be -- $C_3$-$C_{24}$ --.

At Column 41, line 35, "$C_3$-$C_{24}$," should be -- $C_3$-$C_{24}$ --.

At Column 41, line 59, "$R^{16}$" should be -- $R^{16}$, --.

UNITED STATES PATENT AND TRADEMARK OFFICE
CERTIFICATE OF CORRECTION

PATENT NO. : 7,144,937 B2
APPLICATION NO. : 10/718233
DATED : December 5, 2006
INVENTOR(S) : Jerome M. Klosowski et al.

It is certified that error appears in the above-identified patent and that said Letters Patent is hereby corrected as shown below:

At Column 42, line 43, "ailcyl" should be -- alkyl --.

At Column 42, line 45, "$C_3$-$C_{24}$," should be -- $C_3$-$C_{24}$ --.

At Column 42, line 47, "$C_3$-$C_{24}$," should be -- $C_3$-$C_{24}$ --.

At Column 43, line 5, "$R^{16}$"" should be -- $R^{16}$, --.

At Column 43, line 63, "$C_3$-$C_{24}$," should be -- $C_3$-$C_{24}$ --.

At Column 43, line 65, "$C_3$-$C_{24}$," should be -- $C_3$-$C_{24}$ --.

At Column 44, line 18, "$R^{13}$,"" should be -- $R^{13}$, --.

At Column 44, line 63, "$C_3$-$C_{24}$," should be -- $C_3$-$C_{24}$ --.

At Column 44, line 65, "$C_3$-$C_{24}$," should be -- $C_3$-$C_{24}$ --.

At Column 44, line 66, "6, carbon-to-carbon" should be -- 6 carbon-to-carbon --.

Signed and Sealed this

Eighth Day of April, 2008

JON W. DUDAS
*Director of the United States Patent and Trademark Office*